(12) United States Patent
Gross et al.

(10) Patent No.: US 7,426,694 B2
(45) Date of Patent: Sep. 16, 2008

(54) SYSTEM AND METHOD FOR CUSTOMIZING DESIGN OF SETTINGS MANAGEMENT USER INTERFACE SYSTEMS USED TO CONFIGURE SETTINGS FOR INTELLIGENT ELECTRONIC DEVICES

(75) Inventors: Scott J. Gross, Pullman, WA (US); Eric A. Sagen, Pullman, WA (US); Barry A. Klas, Moscow, ID (US); Jeffrey S. McDougle, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 757 days.

(21) Appl. No.: 10/780,373

(22) Filed: Feb. 17, 2004

(65) Prior Publication Data

US 2005/0182979 A1 Aug. 18, 2005

(51) Int. Cl.
*G06F 3/00* (2006.01)
*G06F 3/048* (2006.01)
(52) U.S. Cl. .................. 715/762; 715/763; 715/740
(58) Field of Classification Search ................ 713/100, 713/182; 715/744, 762, 763; 707/102; 718/765
See application file for complete search history.

(56) References Cited

U.S. PATENT DOCUMENTS

| 5,121,477 | A | * | 6/1992 | Koopmans et al. .......... 715/762 |
| 5,650,936 | A |   | 7/1997 | Loucks et al. |
| 5,790,863 | A | * | 8/1998 | Simonyi ..................... 717/113 |
| 5,963,734 | A |   | 10/1999 | Ackerman et al. |
| 6,292,185 | B1 | * | 9/2001 | Ko et al. ..................... 715/763 |
| 6,397,222 | B1 | * | 5/2002 | Zellweger .................... 707/102 |
| 6,509,913 | B2 | * | 1/2003 | Martin et al. ............... 715/762 |
| 6,734,879 | B2 | * | 5/2004 | Hasha et al. ................ 715/737 |
| 7,017,116 | B2 | * | 3/2006 | Elsbree et al. ............. 715/740 |
| 7,111,242 | B1 | * | 9/2006 | Grooters .................... 715/744 |
| 7,114,021 | B2 | * | 9/2006 | Seshadri .................... 710/104 |
| 7,190,976 | B2 | * | 3/2007 | Enns et al. .................. 455/566 |
| 2003/0025732 | A1 | * | 2/2003 | Prichard .................... 345/765 |

OTHER PUBLICATIONS

IBM, Intelligent User Interface Prompt Level, Jun. 1, 1992, IBM, vol. 35, pp. 25-26.*

* cited by examiner

*Primary Examiner*—Suresh K Suryawanshi
(74) *Attorney, Agent, or Firm*—Eugene M. Cummings, P.C.

(57) ABSTRACT

A system and method for customization of the settings configuration process for an intelligent electronics device is disclosed. The disclosed system and method permits the end user to customize not only the operation of an intelligent electronics device for a particular application, but also permits the end user to customize the process used to configure the settings of the device. A customized settings management user interface can be designed by an end user and can be used later during the settings configuration process for one or more intelligent electronics devices. Preferably, the customized settings management user interface will be tailored to meet application-specific objectives and to provide for a relatively more efficient settings configuration process.

40 Claims, 36 Drawing Sheets

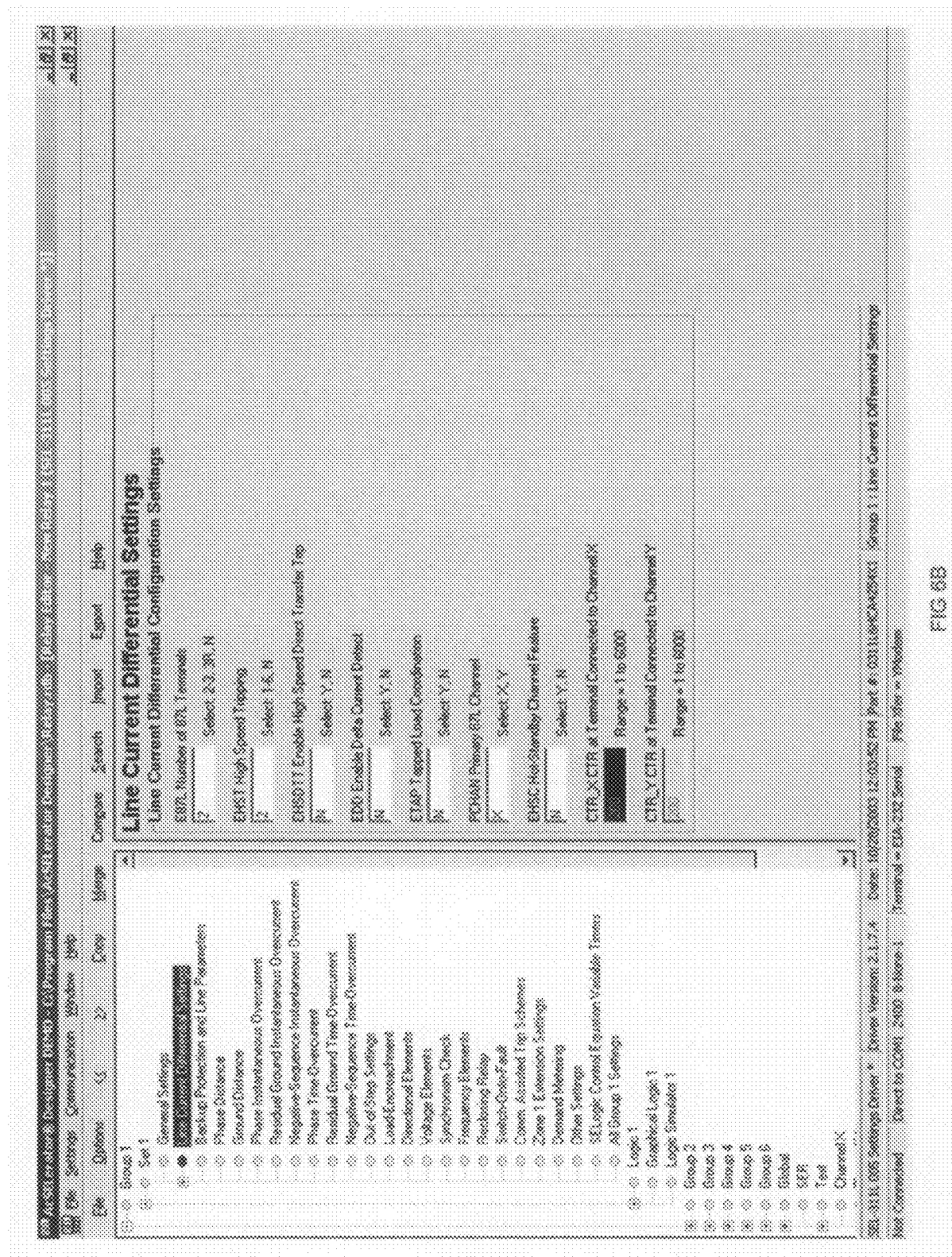

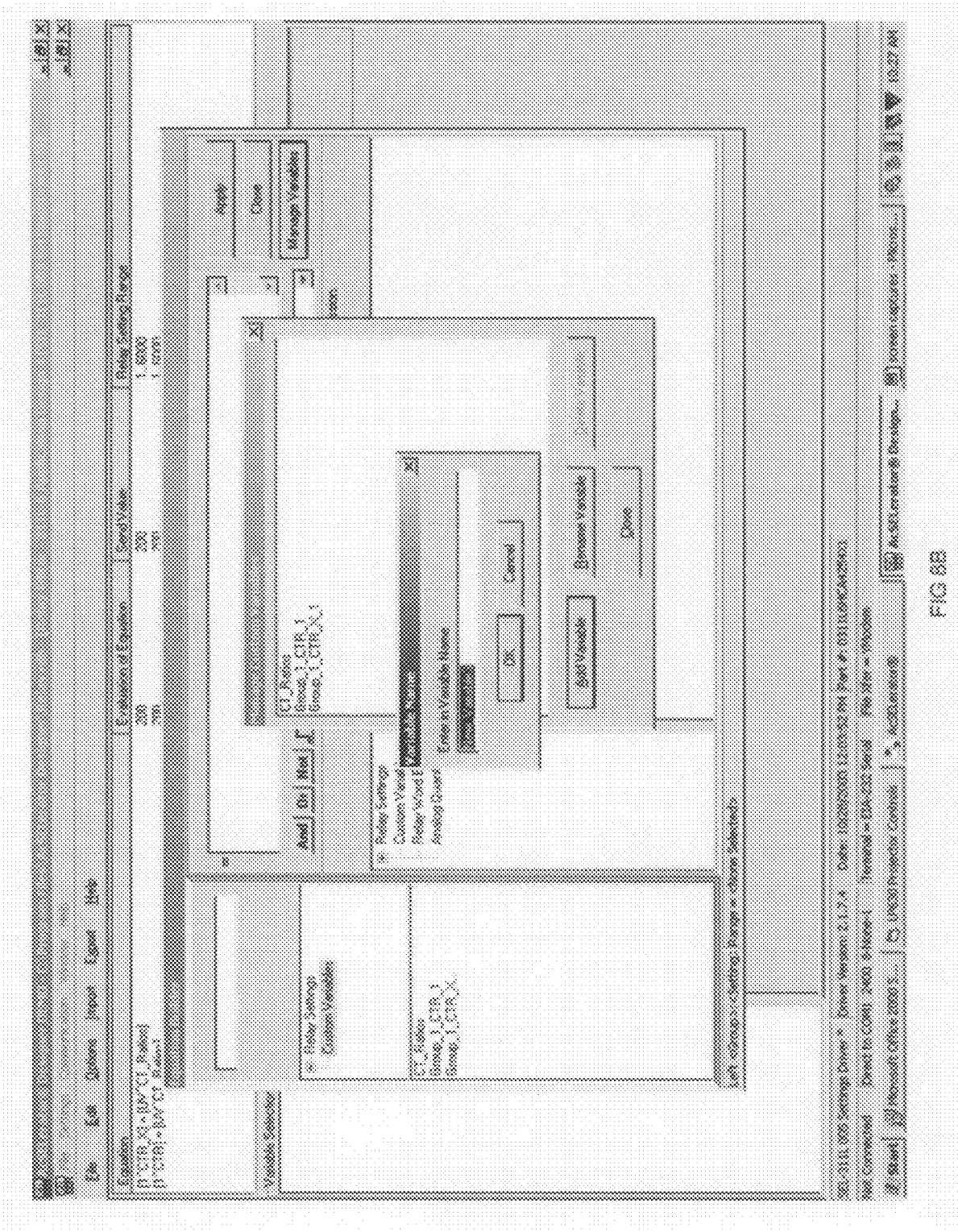

SYSTEM AND METHOD FOR CUSTOMIZING DESIGN OF SETTINGS MANAGEMENT USER INTERFACE SYSTEMS USED TO CONFIGURE SETTINGS FOR INTELLIGENT ELECTRONIC DEVICES

BACKGROUND OF THE INVENTION

The present invention generally relates to settings management systems and methods for configuring the settings of intelligent electronic devices (IEDs) and, more specifically, to a system and method for customizing the design of the settings management user interface system to suit the needs of a particular type of IED and a particular IED application.

User interface systems for IEDs typically perform several functions associated with those devices. For example, user interface systems typically allow the end user to locate, retrieve, and display reports stored in an IED. User interface systems also typically allow the end user to display the status of the IED front panel or the status of IED self-tests.

In addition, and most important for present purposes, user interface systems typically allow end users to manage the configurable settings of the IED and customize the operation of the device to suit their needs. This settings configuration process is carried out by the settings management functions of the user interface system. As an example, the IED may be a microprocessor based protective relay for protecting, monitoring, controlling, metering and/or automating electric power systems and the power transmission lines incorporated therein. In this case, the end user may use the settings management user interface system to set the configurable settings of the protective relay. An example of a configurable setting of the protective relay would be its overcurrent trip threshold. In this case, and depending on the desired settings of the protective relay based upon its intended application of use, the end user may use the settings management user interface system to set the overcurrent trip threshold of the protective relay to be just less than the expected short circuit current of the power transmission line.

Basic settings management systems used to configure the configurable settings of an IED incorporate a user interface system defining an interface through which the end user may configure the configurable settings of the IED. The user interface system is generally a software system and generally forms part of the communication path between the end user and the configurable IED. Systems used to configure the settings of an IED typically include a data link path formed between a terminal or computer and the IED. The terminal or computer is adapted to display desired data retrieved from the IED, under the control of the user interface system. The user interface system permits the exchange of data between the end user and the IED. With respect to its settings management functions, the user interface system typically permits the end user to review settings data from the IED and to input settings data at the terminal or computer and thereby configure the IED settings.

FIG. 1 illustrates a conventional system used to configure the settings of a configurable IED and therefore customize the operation of the IED for its intended application. Illustrated in FIG. 1 are an IED 2, an interface unit 2a, a terminal or terminal emulator 4, a data link 6, and an end user 8. Interface unit 2a is represented as a built-in feature of IED 2, but those skilled in the art will appreciate that the interface unit can also be positioned within the terminal or terminal emulator 4. Data link 6 forms a communication path between the IED 2 and the terminal or terminal emulator 4. Those skilled in the art will appreciate that data link 6 can be any readily available communication link. In the illustrated embodiment, data link 6 is a serial data link, such as an EIA-232 or USB data link.

With respect to carrying out the settings management functions for IED 2, terminal or terminal emulator 4 is adapted to display the IED settings and further accept end user inputs to permit modification of the configurable settings by the end user. The end user is presented with data, based on the protocol of interface unit 2a. Data input by the end user is delivered to the interface unit and ultimately to IED 2 for setting up its configurable settings. In that regard, the end user 8 inputs commands and responds to prompts at the terminal or terminal emulator 4 in order to configure the IED settings. Alternatively, end user 8 navigates through a menu system displayed at terminal or terminal emulator 4 to configure the IED settings.

FIG. 2 illustrates a conventional step-wise process by which an end user can configure the settings for an IED using the system illustrated in FIG. 1. Typically, the end user enters a command to initiate the configuration process, as represented by block 10 in FIG. 2. Thereafter, the IED, through the user interface, responds by prompting the end user to enter a value for a particular configurable IED setting, as represented by block 12. In some circumstances, the IED also identifies an allowable range for the setting value. The end user then responds to the prompt by entering the desired value for the setting, as represented by block 14. If a range was identified, and if the entered value is outside of the allowed range, then an error message is typically displayed at the terminal or terminal emulator and the end user is given the opportunity to re-enter the setting, as represented by blocks 16 and 18.

The end user progresses through each configurable setting until a value for the final configurable setting has been entered. After entering a value for the final configurable setting, the interface unit typically causes the terminal or terminal emulator to display a summary of all of the setting values entered during the configuration process, as represented by blocks 20 and 22. The end user is then given the opportunity to adopt, modify or discard the configured settings entered during the configuration process, as represented by block 24. Once the configured settings are adopted, they are delivered to the IED (see block 26). Next, the IED puts the settings into use for the application, as represented by block 26, and operates in accordance with those settings.

Those skilled in the art will appreciate that several alternative processes for configuring IED settings are known. In one such alternative, the IED does not necessarily present the end user with a prompt for every available setting. In such an alternative, if the IED receives confirmation from an end user that a particular device feature will not be used, the IED might not present the user with prompts for entering a value for the settings associated exclusively with that feature. This is known as "hiding settings" and the settings that are skipped during the settings configuration process are known as "hidden settings."

During the settings configuration process, the configurable settings can be presented to the end user in groups identified by their associated functions. As an example, in a particular IED, the configuration process for the settings associated with the serial port functions of the IED might be accessed by the end user by entering a configuration initiation command designated for those serial port function-related settings, while the configuration process for the settings associated with text messages capable of display by the IED might be accessed by the end user by entering a different configuration initiation command designated for those text message-related settings.

A drawback of these conventional settings management systems and methods is that, during the settings configuration process, the user is presented with certain settings, in a certain order, in response to certain commands, following certain rules. In effect, the user has no control over the settings configuration process and therefore cannot customize the process in any respect. For example, the user cannot customize the process and define the number of settings that must be configured, the order in which settings are configured, the logical grouping of the settings to be configured, the prompts used during the settings configuration process or the rules implemented for defining the configurable settings. The order, logical grouping, prompts and rules are not able to be user-defined. Rather, with conventional systems and methods, the order, logical grouping, prompts and rules are predetermined. This can be inefficient in that with these conventional systems and methods, the user must often deal with hundreds of configurable settings.

FIG. 3 illustrates another conventional system used to configure the settings of a configurable IED. The system illustrated in FIG. 3 implements special graphical user interface software. In this conventional system, the terminal or terminal emulator 4 of the system of FIG. 1 is replaced with computer 28 operating settings management graphical user interface software 30. The settings management graphical user interface software 30 permits the end user to view and configure the IED settings, as desired, during the settings configuration process.

As illustrated in FIG. 3, the computer 28 is connected to an IED 31 by a data link 34. Computer 28 includes the settings management graphical user interface software 30, an IED database 32, a local settings storage unit 36 and settings exchange software 38. The end user is represented in FIG. 3 by block 40.

The settings management graphical user interface software 30 presents the IED settings to the end user 40 and permits the end user to modify the IED settings using a graphical user interface approach. Computer 28 is adapted to communicate with the IED 31, display the IED settings, and accept end user changes thereto. The IED database 32 preferably includes data that will present different groups of configurable settings to the end user based upon the type of IED connected to the computer 28. In that regard, the settings management graphical user interface software 30 can be designed to present settings appropriate for a single type of IED, or alternatively, the end user 40 can select the type of IED from a menu identifying a plurality of IED types and therefore modify only the settings applicable for the selected IED type.

The settings configuration process can be carried out in a manner similar to the process depicted in FIG. 2. While a hierarchical approach is preferred, as discussed below, this step-wise approach is available through the use of settings management graphical user interface software.

No matter which approach is used, during the configuration process, the settings exchange software 38 can retrieve data indicative of the applicable IED settings from IED 31, deliver the settings data to the settings management graphical user interface software 30, which in turn can cause the settings information to be presented on a display associated with computer 28 so that the end user can view the settings and configure them, as desired. Upon completion of the settings configuration process, the end user 40 can save data indicative of the settings configuration process to local settings storage unit 36, which, for example, may be a computer hard drive unit. The end user 40 can also send data indicative of the settings configuration process to IED 32 through the settings exchange software 38, which communicates with the IED over data link 34. Thereafter, IED 32 can put the configured settings into use and operate in accordance therewith.

The graphical user interface approach illustrated in FIG. 3 is also particularly well-suited for presenting the settings to the end user in a hierarchical manner during the settings configuration process. This has notable advantages over the step-wise approach generally illustrated in FIG. 2. When the IED settings are presented in a hierarchical manner, the number of configurable IED settings that need to be simultaneously dealt with by the end user can be significantly reduced. Likewise, each particular setting is often easier to find by the end user as the end user can navigate through the hierarchical presentation of IED settings.

Using this hierarchical approach, the configurable IED settings are prearranged in multiple levels of hierarchy. For example, the hierarchy presented by a settings management user interface system might include four levels of hierarchy designated groups, categories, sub-categories, and settings. Within these levels of hierarchy are the configurable settings. In this manner, the end user can configure a particular setting by navigating through the presentation. In effect, the end user selects the appropriate one(s) of the group, category and/or sub-category of that setting, if any.

Modern graphical user interface software packages are conventionally adept at presenting data, folders and files in levels of hierarchy, as desired. Accordingly, conventional settings management graphical user interface system can be readily adapted to present the hierarchy of the groups, categories, sub-categories and configurable settings. In addition to presenting each item contained within each of these levels of hierarchy, the items within a particular level of hierarchy preferably include conventional associated viewable indicia signifying that one or more sub-levels of hierarchy exist within the hierarchical structure for a particular item. The indicia are helpful in permitting the end user to navigate through the hierarchical presentation and locate the configurable settings presented by the settings management user interface system. The end user can therefore more easily locate and select an IED setting to be configured.

When the desired IED setting to be modified is located and selected by the end user, the end user can modify the setting by changing the setting value in the appropriate database field associated with that setting. In addition to the field associated with the value of the IED setting, each IED setting also preferably includes an associated name (e.g., Z1P), an associated description (e.g., "Reach Zone 1"), an associated units designation (e.g., Ohms secondary), and an associated designated range of allowable values (e.g., Range=0.05 to 65.00). Each setting can also have additional comments associated therewith.

IED settings management graphical user interface systems using a hierarchical approach also preferably utilize a "gray out" feature, which is similar to the "hidden settings" feature described above. In that regard, the settings management graphical user interface software is preferably designed to disable the configuration process for settings associated with unused features. Under such circumstances, the respective fields associated with the values for those settings are disabled and cannot be modified by the end user. In accordance with conventional graphical user interface software, the appropriate level of hierarchy and therefore the appropriate disabled setting value fields are "grayed out" to indicate that they cannot be modified by the end user. In other words, if all of the settings within a particular category are directed to unused features, the category is "grayed out" to indicate that nothing within that category can be modified by the end user.

In the example illustrated in FIG. 3, the settings management graphical user interface software 30, IED database 32 and local settings storage unit 36 are all contained within computer 28. It will be appreciated that one or more of the functions carried out by them could be carried out by the IED. For example, it would be possible to store the IED database record corresponding to the particular type of IED within the IED. The settings management graphical user interface software could then retrieve the IED database record and display the configurable IED settings accordingly. In one arrangement, the IED database record could be a file readable by a web browser, and the settings management graphical user interface might be a web browser.

The above-identified conventional systems used to configure the settings of an IED are generally limited. While the hierarchical approach permits the end user to manage a large number of settings to a certain extent, the conventional systems are limited in that they do not permit the user to define aspects of the settings management user interface system design to fit the particular needs of the type of IED and its application of use.

More particularly, with the conventional systems, only certain settings may be customized due to the limitation of predetermined command prompts which are arranged in a predetermined order based on predetermined rules or, alternatively, in a predetermined hierarchical arrangement. This is particularly unfavorable whereupon the end user must configure hundreds or even thousands of configurable settings.

For example, if the end user desires that the device perform a particular function, the configurable setting(s) of interest must be identified from a universe of what could be thousands of configurable settings, the settings to be re-configured must be modified appropriately, and during that process, the end user must not modify other configurable device settings. At the same time, the end user must maintain a record of all of the IED settings, even those not being used, in order to be able to correct any error occurring in the event of an improperly configured setting. Accordingly, while having certain, defined capabilities, these conventional systems fail to provide the end user with control over the order that the configurable IED settings are presented during the configuration process, the logical grouping of the IED settings presented to the end user, the prompts presented during the configuration process, or the rules used to define which IED settings are skipped or disabled during the configuration process based upon unused features of the IED.

In addition, with the conventional systems, the settings management user interface software is designed to display the settings in a certain location, with certain associated names, certain associated allowed ranges for the setting values, certain comments, certain designated units, and certain rules for hiding or "graying out" the field associated with the setting value. The end user cannot change the design of the settings management user interface software. Therefore, the end user cannot modify any of these aspects of the settings management user interface software.

In the typical IED field environment, the end user sets only ten to twenty percent of the required settings. With conventional systems, an end user unnecessarily has to deal with often hundreds and sometimes even thousands of additional settings. As a result, the time required to complete the configuration process is needlessly inefficient for a particular application. In particular, with conventional systems, the end user is typically provided with access to all settings. For each IED configuration, the end user is faced with the challenge of selecting the settings to be configured from the typical large universe of configurable IED settings available. As a result, the likelihood that the end user errs by incorrectly and/or unnecessarily changing an IED setting is increased. Therefore, there is a need to provide the end user in the field with access only to those settings applicable for a particular application.

Furthermore, there is a need to increase consistency in the settings for all of the same IED types used in the same applications. There is also a need to increase the efficiency of the configuration process by readily providing for determining IED setting based on the configuration of one or more other IED settings, as desired. For example, an IED setting could be based on one or more mathematical equations utilizing one or more other IED settings, it could be based on one or more Boolean logical equations utilizing one or more other IED settings, it could be based on one or more comparison equations utilizing one or more other IED settings, or it could be based on one or more hybrid (or mixed) mathematical, Boolean logical, and/or comparison equations utilizing one or more other IED settings.

In addition, with conventional systems, the end user does not have the ability to change the design of the settings management user interface system and tailor it to the specific application for the IED. Therefore, the IED settings configuration process is generally not conducted in a user-friendly application-specific field environment. In view of this shortcoming with conventional systems, there is a need to provide the end user with the ability to customize the name associated with each IED setting, the designated units associated with each IED setting, the designated allowed range of values associated with each IED setting and the comments associated with each IED setting, as desired. Giving the end user the ability to change the design of the settings management user interface allows the settings management user interface to be adapted for use in different languages. Also, giving the end user the ability to change the design of the settings management user interface in an environment removed from the field allows the end user the ability to design it so that it provides a user-friendly field environment tailored to the specific application for the IED. The resulting user-friendly field environment increases the efficiency of the IED settings configuration process, by reducing the time required to complete the process and reducing the potential rate of error.

In effect, with conventional systems, the customization available to the end user has been limited to customization of the device. In particular, with conventional systems, by modifying the values of the IED settings, the end user has been able to customize the operation of the IED to suit the particular application needs. The present invention is directed to customization of a different sort-namely, customization of the settings configuration process. Until the present invention, the end user has never had the ability to customize the settings configuration process, and more particularly has never had the ability to customize that process by modifying, and in effect customizing, the design of the user interface. The present invention permits the end user to customize not only the IED operation for a particular application, but also permits the end user to customize the process used to configure those settings. Preferably, the design of the user interface will be tailored to meet application-specific objectives and further be tailored to provide for a relatively more efficient settings configuration process.

In view of the foregoing, a preferred advantage of the present invention is that it permits the end user to customize the settings configuration process by changing the design of the settings management user interface implemented during that process. As a result, the design of the settings management user interface for a particular IED application can be tailored to that application. In addition, the settings management user interface is preferably designed so that it is user-friendly in the field environment. To help achieve that benefit, the settings management user interface can be designed in an environment removed from the field environment, such as a laboratory environment.

An additional preferred advantage of the present invention is that the settings management user interface can be designed so that a field-positioned settings configuration specialist only has access to configure IED settings pertinent to the intended application of the device. As a result, the total number of settings available for configuration during the settings configuration process can be reduced, adding a level of security by limiting the access of the settings configuration specialist to the settings required by a particular application. This increases the overall efficiency of the settings configuration process.

In addition, a preferred advantage of the present invention is that the application interface designer is provided with control over the order IED settings are presented by the settings management user interface during the configuration process, the logical grouping of the settings within the settings management user interface, the prompts displayed by the settings management user interface during the configuration process, and/or the rules for adjusting the number of settings available to be configured in the field for a particular application.

Another preferred advantage of the present invention is that the application interface designer has the ability to design the settings management user interface by customizing the name associated with each IED setting, the designated units associated with each IED setting, the designated allowed range associated with each IED setting and the comments associated with each IED setting, as desired. The settings management user interface can therefore be adapted for use in different languages. Also, the settings management user interface can be designed to provide for a user-friendly field environment tailored to the specific intended application for the IED. The efficiency of the IED settings configuration process is therefore increased.

These and other preferred advantages of the present invention will become apparent from the following description. It will be understood, however, that a system or method could still appropriate the claimed invention without accomplishing each and every one of these preferred advantages, including those gleaned from the following description. The appended claims, not these advantages, define the subject matter of the invention. Any and all advantages are derived from preferred aspects of the invention, not necessarily the invention in general.

SUMMARY OF THE INVENTION

The present invention is directed to a system and method for customizing the settings configuration process for an intelligent electronics device (IED). To customize the settings configuration process, the present invention is directed to a system and method for modifying the design of the settings management user interface system from which an IED user can then configure the configurable settings of the IED. Preferably, the user can design the customized settings management user interface system to facilitate the settings configuration process for an IED. In a preferred form, the system includes a first computer having graphical user interface software in the form of editor software. The first computer preferably is in communication with a second computer having graphical user interface software in the form of display software. The editor software of the first computer preferably permits an application interface designer to modify settings management graphical user interface software and design a customized settings management graphical user interface tailored to the specific intended application of the IED to be configured. In that regard, the editor software preferably permits the application interface designer to define and modify aspects of conventional settings management graphical user interface software tailored to the settings configuration process for the IED application, including but not limited to the order in which IED configurable settings are presented by the settings management user interface to a field-positioned settings configuration specialist during the settings configuration process, the logical grouping of IED settings within the settings management user interface, the prompts, if any, displayed by the settings management user interface for viewing by the settings configuration specialist during the IED settings configuration process, and/or the rules used to determine which, if any, IED settings can be configured during the settings configuration process. In addition, the editor software preferably permits customization of the name associated with each IED setting, the designated units associated with each IED setting, the designated allowed range associated with each IED setting and the comments associated with each IED setting, as desired, to create a user-friendly field environment during the settings configuration process.

The first computer preferably also includes a database that permits aspects of the user-defined settings management user interface design to be chosen, saved, and/or copied, as desired, based upon the type of IED to be configured. The first computer preferably further includes a storage unit (e.g., hard drive) permitting pertinent aspects of the customized settings management user interface to be saved for later distribution to a second field computer.

The second (field) computer may download the saved information related to the customized settings management user interface from the first computer. The display software contained within the second computer allows the settings configuration specialist to configure the appropriate IED settings by using the customized settings management user interface. The second computer preferably includes a local storage unit (e.g., hard drive) for storing the customized settings management user interface and the configurable IED settings set during the settings configuration process. The display software of the second computer preferably can be selectively connected to an IED to be configured and can communicate therewith via settings exchange software. The settings exchange software preferably retrieves data indicative of the settings of the IED and sends data to the IED indicative of the value of the settings, as determined during the settings configuration process.

BRIEF DESCRIPTION OF THE DRAWINGS

FIGS. 5A-5F are screen captures showing functions of the system of FIG. 4.

FIGS. 6A-6G are screen captures showing additional functions of the system of FIG. 4.

FIGS. 8A-8F are more screen captures showing functions of the system of FIG. 4.

FIGS. 9A-9F are further screen captures showing functions of the system of FIG. 4.

DETAILED DESCRIPTION OF THE PREFERRED EMBODIMENT

Figure 1:
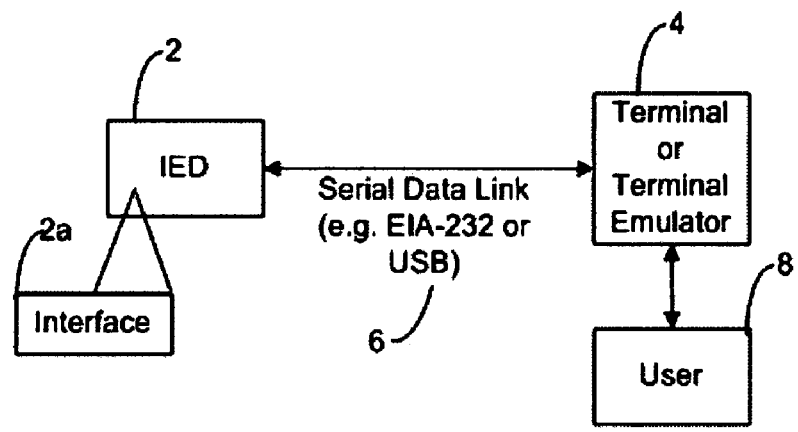
FIG. 1 is a schematic representation showing a conventional system used to configure the settings of an IED.
Figure 3:
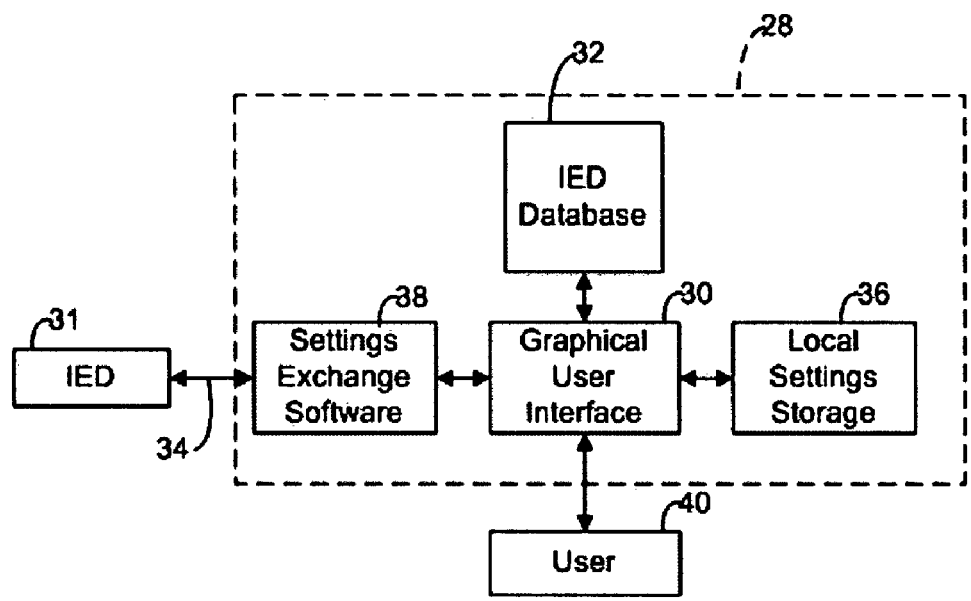
FIG. 3 is a schematic representation showing another conventional system used to configure the settings of an IED.
Figure 2:
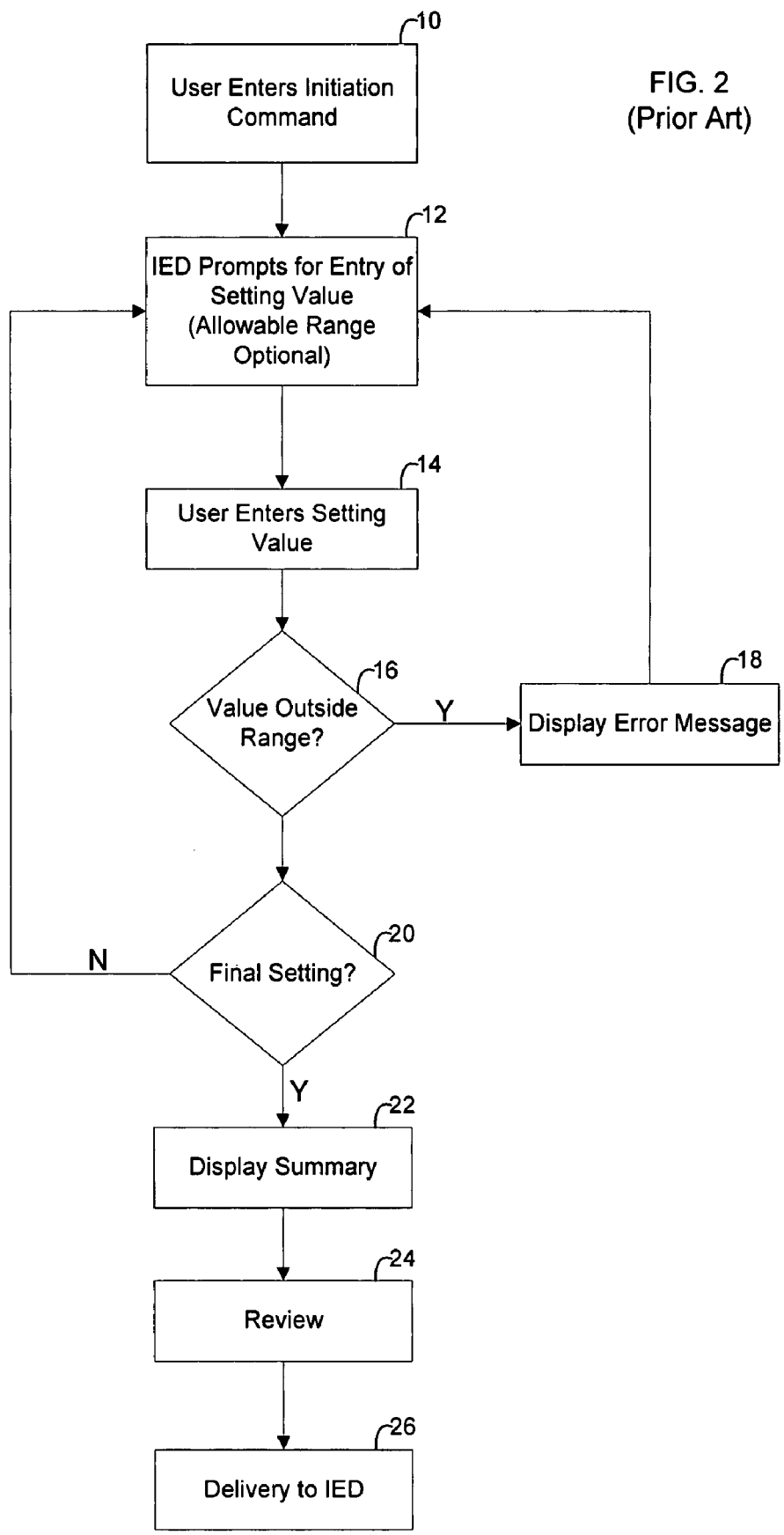
FIG. 2 is a flowchart diagram representing the steps performed during a conventional settings configuration process.
Figure 4:
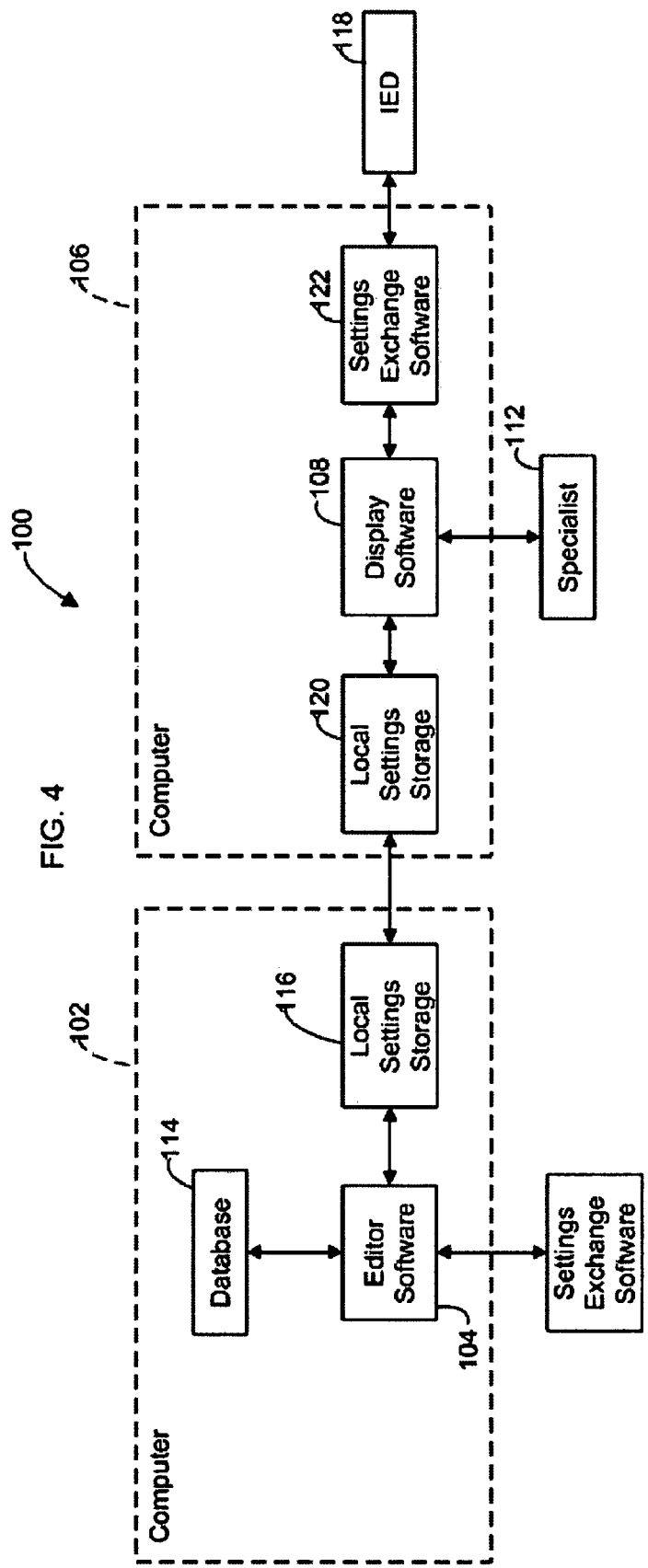
FIG. 4 is a schematic representation showing a preferred representation of a system designed in accordance with the principles of the present invention.

FIG. 4 illustrates a system 100 adapted to permit creation of a customized settings management user interface system at a first computer 102. First computer 102 is preferably positioned in a laboratory environment. The customized settings management user interface system is preferably designed by an application interface designer to facilitate the settings configuration process for an intelligent electronics device (IED), based upon the intended type of IED and its intended application of use. System 100 is also adapted to permit a settings configuration specialist to configure the configurable settings of an IED through use of the customized settings management user interface system at a second computer 106, generally positioned at a field environment.

The first computer 102 preferably executes graphical user interface software, shown in the form of editor software 104, in known manner. First computer 102 preferably is selectively in communication with second computer 106 in known manner. Second computer 106 also preferably executes graphical user interface software, shown in the form of display software 108, in known manner.

The editor software 104 executed by first computer 102 preferably uses known graphical user interface software techniques to permit the application interface designer 110 (e.g., engineer) to modify the settings of otherwise conventional settings management graphical user interface software and design a customized settings management graphical user interface tailored to the specific type of IED to be used and its specific application intended for use. Among other things, through the editor software, the application interface designer can create a customized settings management graphical user interface that modifies and controls the order in which IED configurable settings are presented to the settings configuration specialist 112 (e.g., technician) in the field during the settings configuration process. The editor software can also be used to modify the logical groupings of IED settings within the settings management user interface, the prompts, if any, displayed by the settings management user interface for viewing by the settings configuration specialist 112 (e.g., technician) in the field during the IED settings configuration process, and/or the rules used to determine which, if any, IED settings can be configured during the settings configuration process.

In addition, the editor software 104 preferably uses known programming routines and software techniques to permit the application interface designer 110 to customize the name associated with each IED setting, the designated units associated with each IED setting, the designated allowed range associated with each IED setting and the comments associated with each IED setting, as desired, to create a user-friendly field environment for the settings configuration specialist 112 in the field during the settings configuration process.

The first computer 102 preferably also includes a database 114 that permits aspects of the customized settings management user interface design to be chosen, saved, and/or copied, as desired, based upon the type of IED to be configured. The first computer 102 preferably further includes a storage unit 116 (e.g., hard drive) permitting one or more computer files generated by the editor software 104 during the application user interface design process to be saved for later distribution to the second computer 106.

The second computer 106 may receive the customized settings management user interface on the fly or later download the computer file(s) generated during the application user interface design process from the storage unit 116 of first computer 102. The display software 108 contained within the second computer 106 allows the settings configuration specialist 112 to use the customized settings management user interface. Through its use, the settings configuration specialist may configure the appropriate IED settings to be used by an IED 118, in accordance with conventional techniques.

The second computer 106 preferably includes a local storage unit 120 (e.g., hard drive) for storing the downloaded computer files related to the customized settings management user interface and the configurable IED settings set during the settings configuration process. The display software 108 of the second computer 106 preferably selectively communicates with the IED 118 to be configured via settings exchange software 122. The settings exchange software 122 preferably can retrieve data indicative of the settings of the IED 118, upon demand, and send the data to the customized settings management user interface for presentation to the settings configuration specialist 112 during the settings configuration process. The settings exchange software 122 can also preferably send data to the IED 118 indicative of the value of the settings, as entered by the settings configuration specialist 112 during the settings configuration process. The settings configuration process can occur in real-time, or can be conducted offline, wherein the settings configuration data is preferably stored in local storage unit 120 and transferred to the IED at a later time prior to the intended application.

Those skilled in the art will appreciate that, in lieu of the system illustrated in FIG. 4, one computer may execute both the editor software 104 and display software 108. Under such circumstances, that single computer would be used to carry out the application user interface design process and the settings configuration process. Those skilled in the art will also appreciate that this single computer may be external to the IED or contained within the IED itself. In some uses, the application designer can use a single computer to test the user interface and download settings to the IED to test the application design. Additionally, those skilled in the art will appreciate that one or both computers illustrated in FIG. 4 may be contained within the IED.

It will also be appreciated by those skilled in the art that the application interface designer and the settings configuration specialist identified with reference to FIG. 4 could be the same person. Nonetheless, that is not always the case. In one typical situation, the application interface designer will be an engineer and the settings configuration specialist will be a technician. In these circumstances, the present invention offers advantages. Among other things, the application interface designer (engineer) can control the IED settings accessible by the settings configuration specialist (technician), adding a level of security to the settings configuration process.

Preferred aspects of the present invention can be more fully understood by referring to the several following examples. In these examples, the intelligent electronics device being configured is a protective relay used to protect, monitor, control, meter and/or automate electric power systems and the power transmission lines incorporated therein. The use of a protective relay in the following examples is merely for illustrative purposes as the present invention has equal applicability when used to customize the settings configuration process for other IEDs, including but not limited to, communications processors, remote terminal units, multiplexers, meters, etc.

EXAMPLE 1

The first example illustrates an application interface design process wherein the editor software (FIG. 4) is used to design a customized settings management user interface having a simplified presentation of configurable settings. In this example, an application interface designer, i.e. an engineer, determines the applicable configurable settings for the relay (IED). For present purposes, it will be assumed that specific configurable settings are to be modified in a large number of relays and installed at various locations by a settings configuration specialist, i.e. second user, i.e. a technician. It will also be assumed that almost all of the relay settings based upon the intended applications for a large number of relays is standard. In this case, the only relay settings that need to be changed from installation to installation are two text strings, which identify the location of the relay after it is installed. In this scenario, the engineer would typically want to ensure that the technician does not inadvertently change any of the other relay settings.

Using the editor software (FIG. 4), the engineer may view and access all relay settings. The engineer configures the settings of the relay that are not dependent on the location of the relay, as desired. The engineer does not configure those relay settings that are to be configured in the field and identify the location of the relay after it is installed (i.e., the two text strings). Finally, the engineer customizes the settings management graphical interface to make the installation location settings available to the technician for configuration out in the field. In addition, the engineer customizes the settings management graphical interface so that no other of the relay settings are configurable out in the field.

Figure 5A:
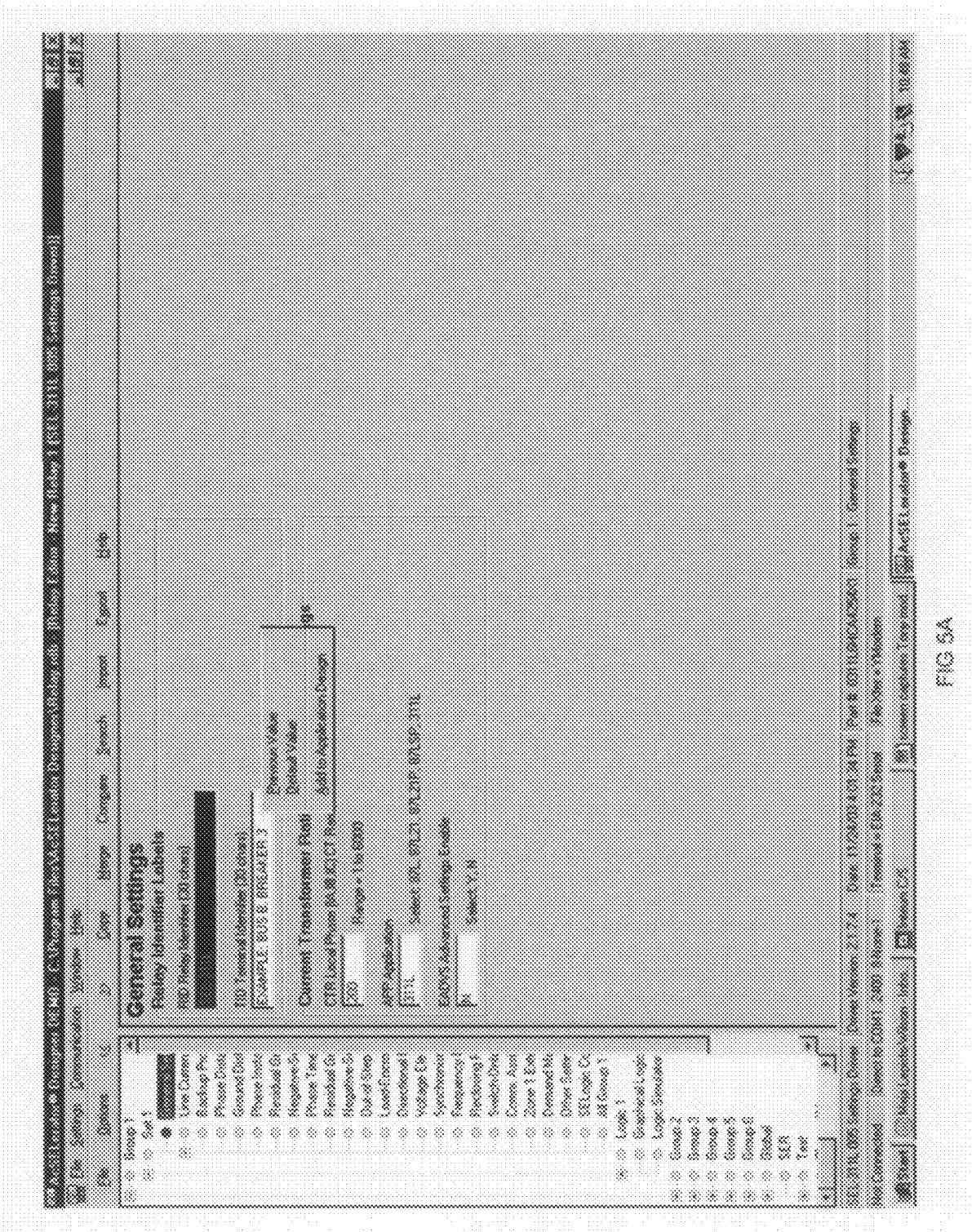

In this particular example and as illustrated in FIG. 5A, the two relay settings to be made available for configuration out in the field are presented within the hierarchical framework of the user interface. In particular, those two settings are located in the "Group 1" category, in the "Set 1" sub-category, and in the "General Settings" sub-category (partially covered in FIG. 5A). The two relay settings to be made available for configuration by the technician in the field are named "RID" and "TID". In this example, the engineer can make these two relay settings available to the technician by navigating to an appropriate page of the editor pertaining to the sub-category in which the two settings are located within the hierarchical framework of the user interface. In this case, the page is entitled "General Settings," which corresponds to the name of the sub-category.

The engineer then performs an appropriate task to make the two relay settings available to the technician for configuration in the field. Conventional graphical user interface routines can be used to accomplish this task. In this example, for instance, the engineer can position a computer mouse pointer on the box designated for input of the value of the desired setting and thereafter depress the right button on the mouse. In response to this command, the software can be adapted to present a drop-down menu with at least one selection enabling the setting to be part of the customized user interface. In this case, the engineer simply selects the "Add to Application Design" selection within the drop-down menu. The engineer repeats this process for the second relay setting to be configurable in the field.

Preferably, in appropriate cases, the engineer can select an entire category or sub-category and thereby enable all of the settings contained therein to be configurable in the field.

The editor software may further be adapted to indicate all settings that have been made available for configuration in the field. For example, the value input box for the two settings selected (the "RID" and "TID" settings) may change a different color, such as blue. In addition, the editor software may be adapted to inhibit the configuration of these settings by the editor software once they are selected to be configurable in the field.

EXAMPLE 2

For illustrative purposes, this example builds on Example 1 set forth above. The editor software is also adapted to permit the engineer to modify the name associated with any of the relay settings, the value range associated with any of the relay settings, the designated units associated with any of the relay settings and the comments related to any of the relay settings. Because of this capability, the engineer is able to create a user-friendly settings management interface for the technician.

Figure 5B:
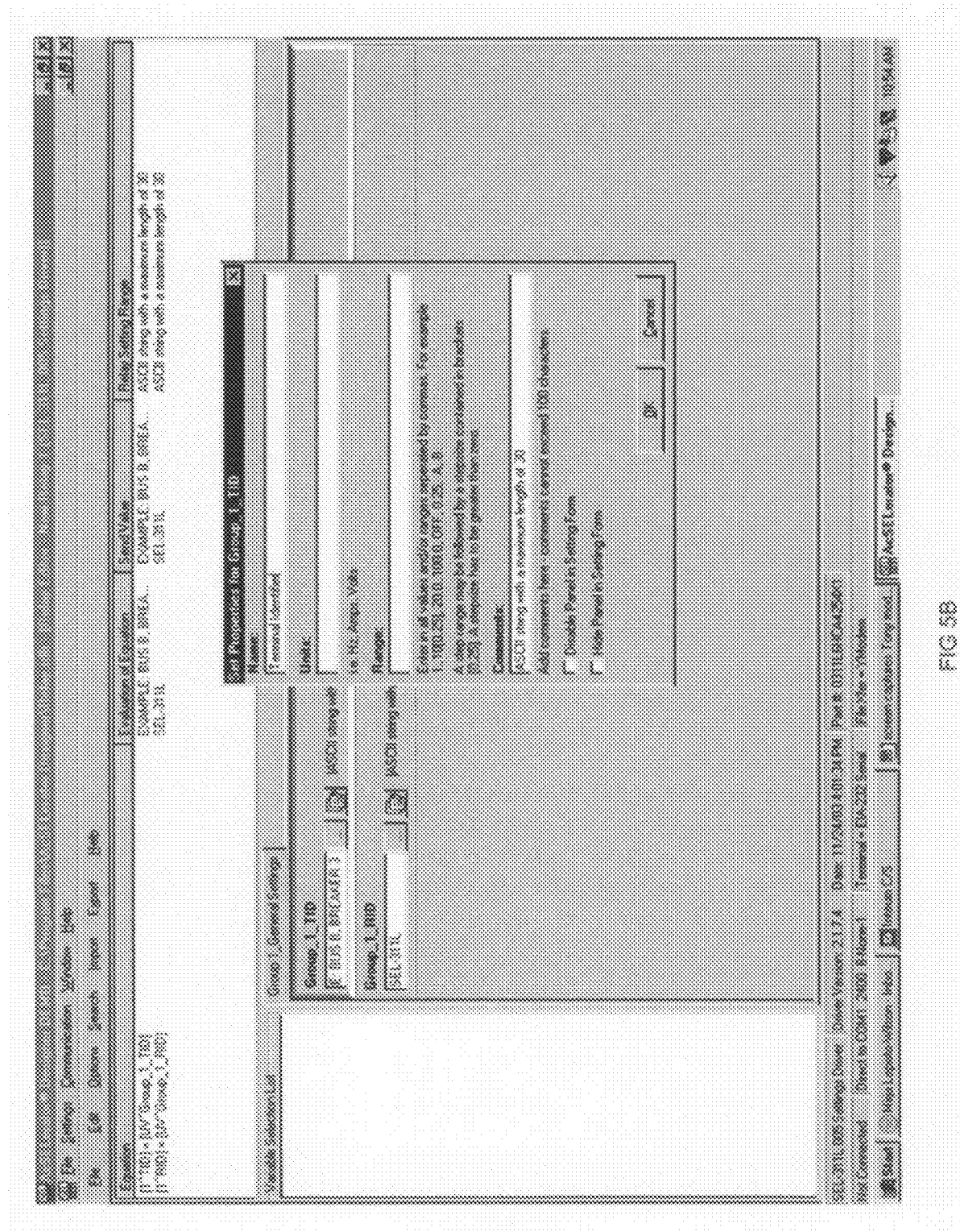

In the example illustrated in FIG. 5B, the engineer will navigate to the appropriate page within the editor software for making changes to the name, value range, units and/or comments associated with appropriate relay setting. The engineer will then perform the appropriate steps to modify one or more of these properties of the relay setting. In this case, the engineer selects the relay setting by positioning the mouse pointer over the appropriate setting position (in this case "Group_ 1_TID) and double-clicking the left mouse button. In response, the editor software will open a dialog box having fields for setting the properties for the relay setting. The engineer can change the name (formerly "Group_1_TID"), units (formerly "Units"), range (formerly none), and comments (formerly "ASCII string with a maximum length of 30").

In this example, the engineer changes the name to "Terminal Identifier", erases the units, leaves the range blank, and leaves the comments unchanged (See FIGS. 5B and 5C). It will be appreciated that the range and comments could have been changed and that a new units designation could have been entered. It will also be appreciated that the engineer could have entered all of the properties in any language, so the novel features described in this example could have been used to change the base language for the relay settings. In this example, the second relay setting pertaining to the installation location of the relay has not been renamed.

Figure 5D:
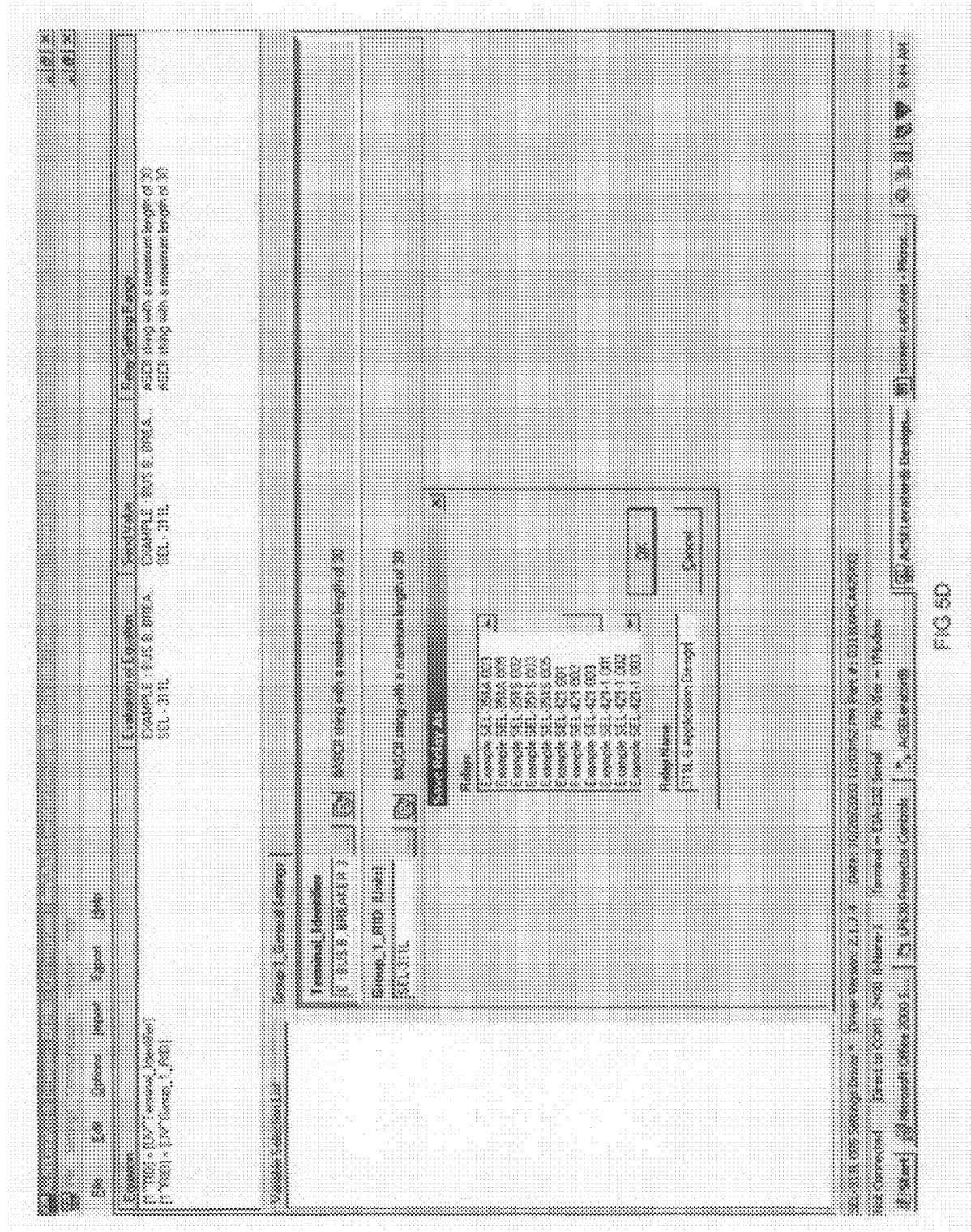

With respect to Examples 1 and 2, after creating the application design for the customized settings management user interface, the engineer can save its settings to the storage unit contained within the first computer, such as through use of the conventional "File, Save As" menu selections, as illustrated in FIG. 5D. In addition, the engineer can send the resulting application design file to a technician via electronic mail, over a local area network, or in any other way known in the art. Likewise, the technician can download the resulting file.

Figure 5E:
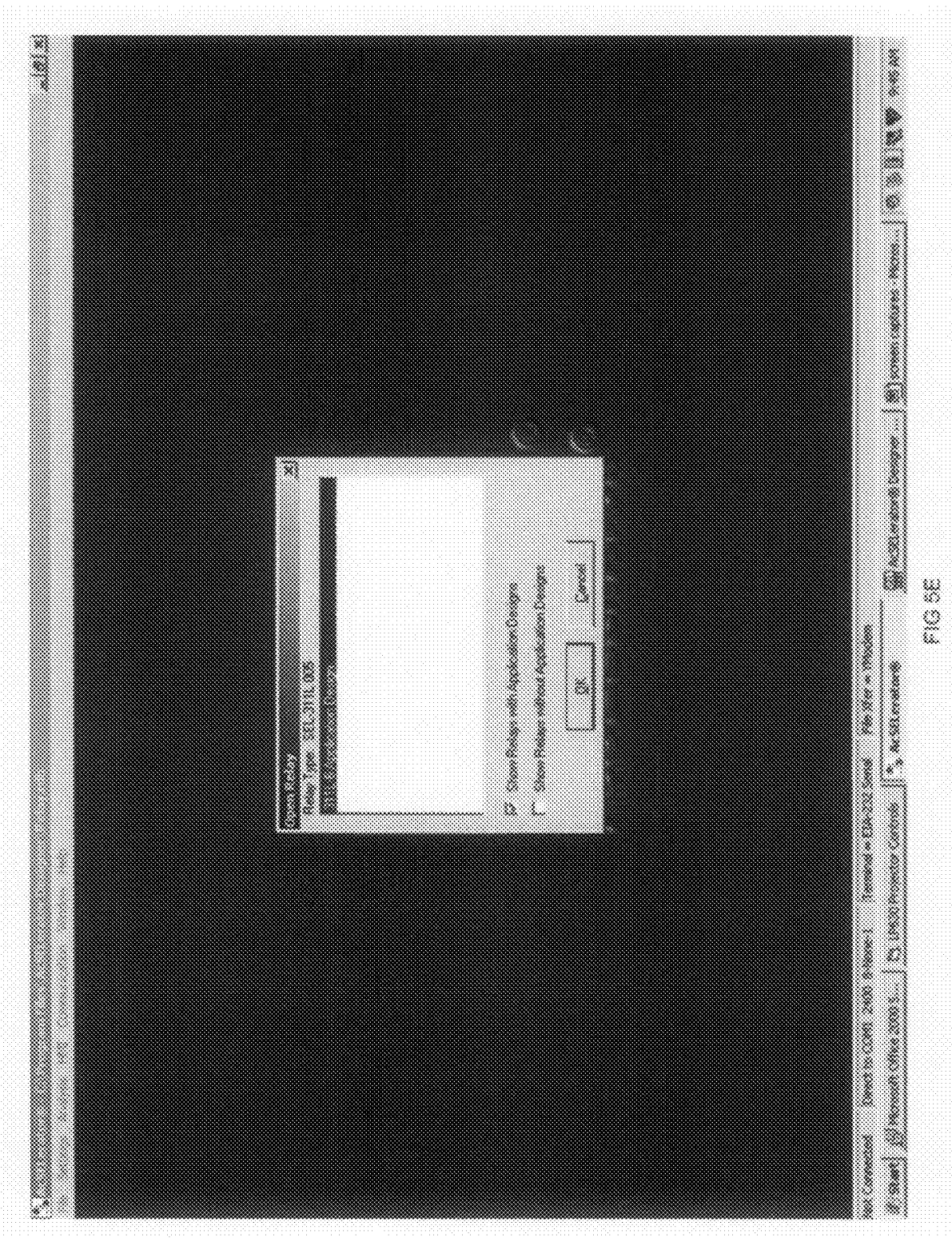

Upon receipt of the resulting application design file, the technician is then able to access it and open the customized settings management user interface through the display software for conducting the in-field settings configuration process, as desired. Initially, the technician selects the appropriate customized settings management user interface to be used by selecting the appropriate application design file. In this case, the technician uses a "Settings, Open" file menu command to accomplish that task, as illustrated in FIG. 5E.

Figure 5F:
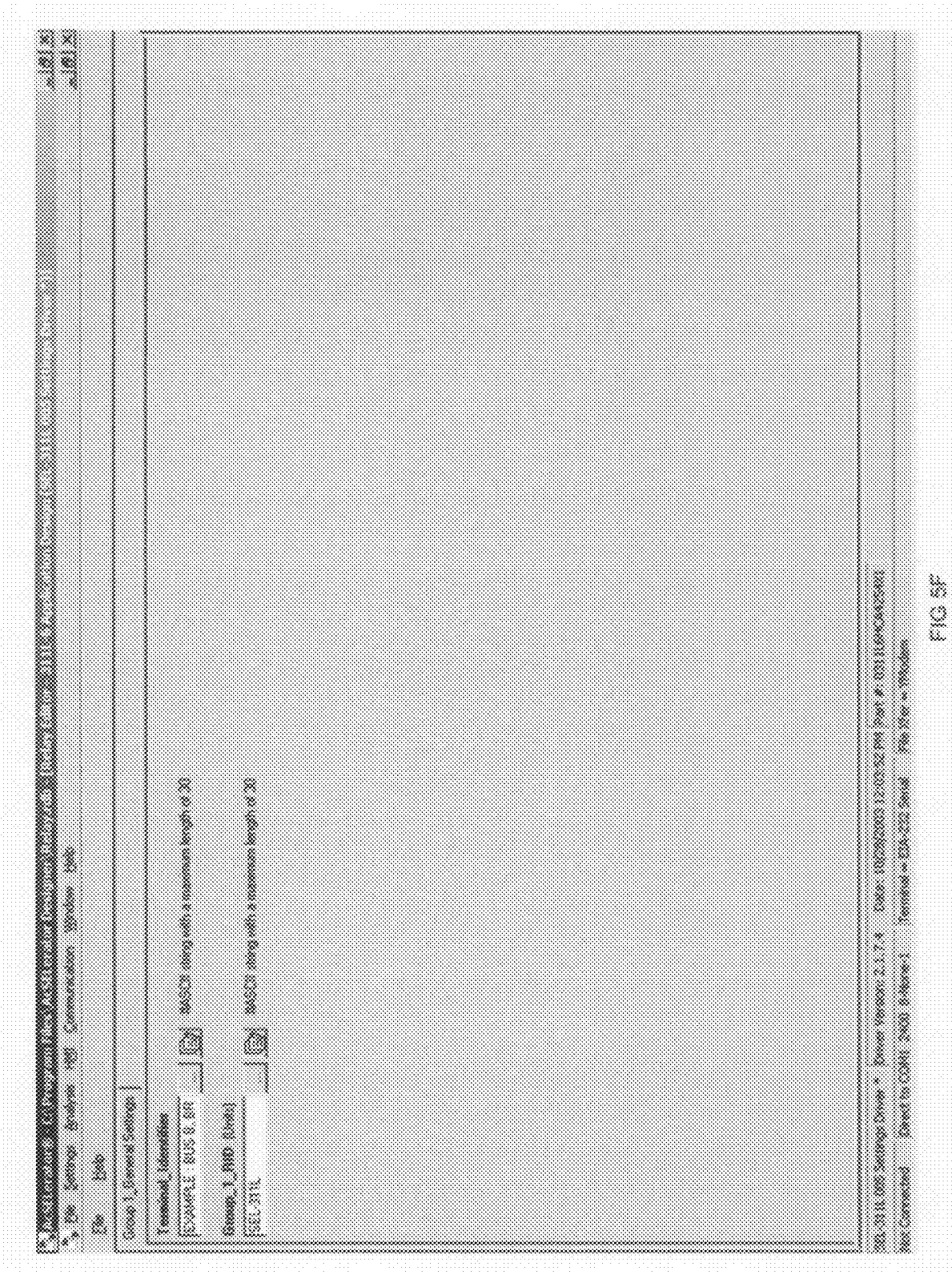

After opening the application design file, the technician can only view and edit the two relay settings enabled by the engineer to be configured in the field environment, as illustrated in FIG. 5F. All other relay settings are hidden from the view of the technician and cannot be configured by the technician. It should be noted that the name of the first relay setting configurable by the technician is named "Terminal_Identifier," in accordance with the change made by the engineer. The technician can conduct the field configuration process by changing the text strings pertaining to the two relay settings, and then can save the new settings and download the new settings to the relay.

In Examples 1 and 2, the value ranges associated with the relay settings were not modified. In the event, however, that the value range of a setting is modified by the engineer, the technician preferably cannot enter a value for that setting outside the designated range. It will be appreciated that this permits the engineer to further control the settings configuration process and even, in particular cases, provide for an additional safety feature.

In addition, in the event the technician tries to enter a value for the setting that is outside the designated range, but within the range that the relay (IED) will accept, the user interface preferably will not accept the entered value and will indicate this "out of designated range" condition to the technician, by, for example, highlighting the value field box in yellow. Similarly, in the event the technician tries to enter a value for the setting outside the range that the relay (IED) will accept, the user interface preferably will not accept the entered value and will indicate this "out of relay range" condition to the technician, by, for example, highlighting the value field box in red. In both cases, the attempted entries will preferably not be sent to the relay for configuration.

EXAMPLE 3

In this example, the engineer uses the editor software to regroup relay settings to make them easier to find by the technician in the field. For the relay used in this example, it is assumed that there are up to three current transformer ratio (CTR) settings. It is also assumed that two of the three CTR settings will be used at the particular utility. In this example, those two CTR settings to be used are located in different sub-categories, and the engineer wishes to group them together to make them easier for the technician to find. In addition, in this example, the engineer wants to make all relay settings available to the technician for configuration in the field because, unlike the prior examples, it is assumed that the technician must configure many relay settings from installation to installation.

Figure 6A:
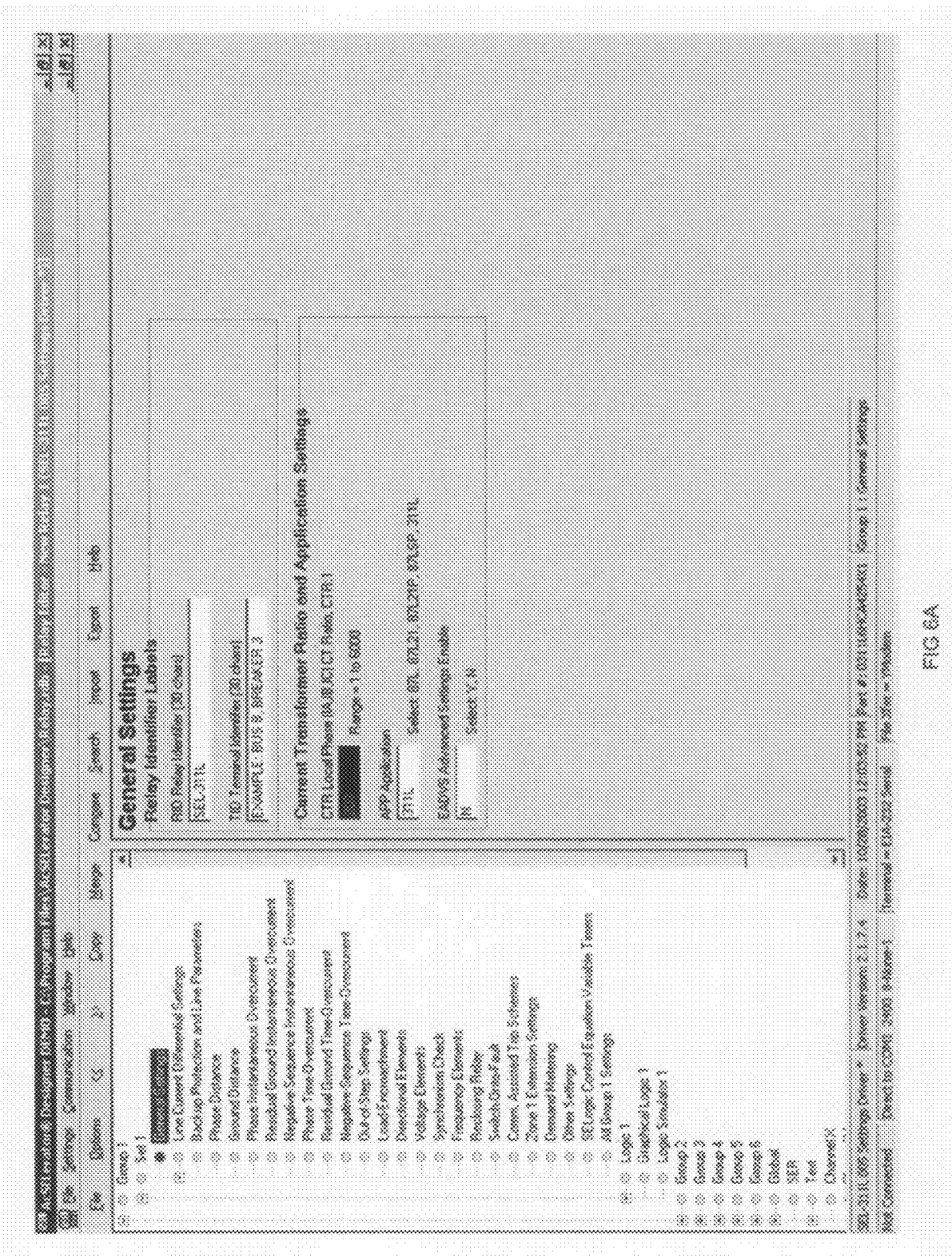

As illustrated in FIG. 6A, the engineer navigates through the hierarchical presentation of groups, categories, etc. to the first relay setting to be regrouped, in this case named "CTR" and located within the "Group 1" group, "Set 1" category and "General Settings" sub-category. The engineer then selects that first setting to be regrouped, in any conventional manner. Preferably, the value field associated with that setting is then highlighted, as shown, to indicate its selection by the engineer.

Figure 6C:
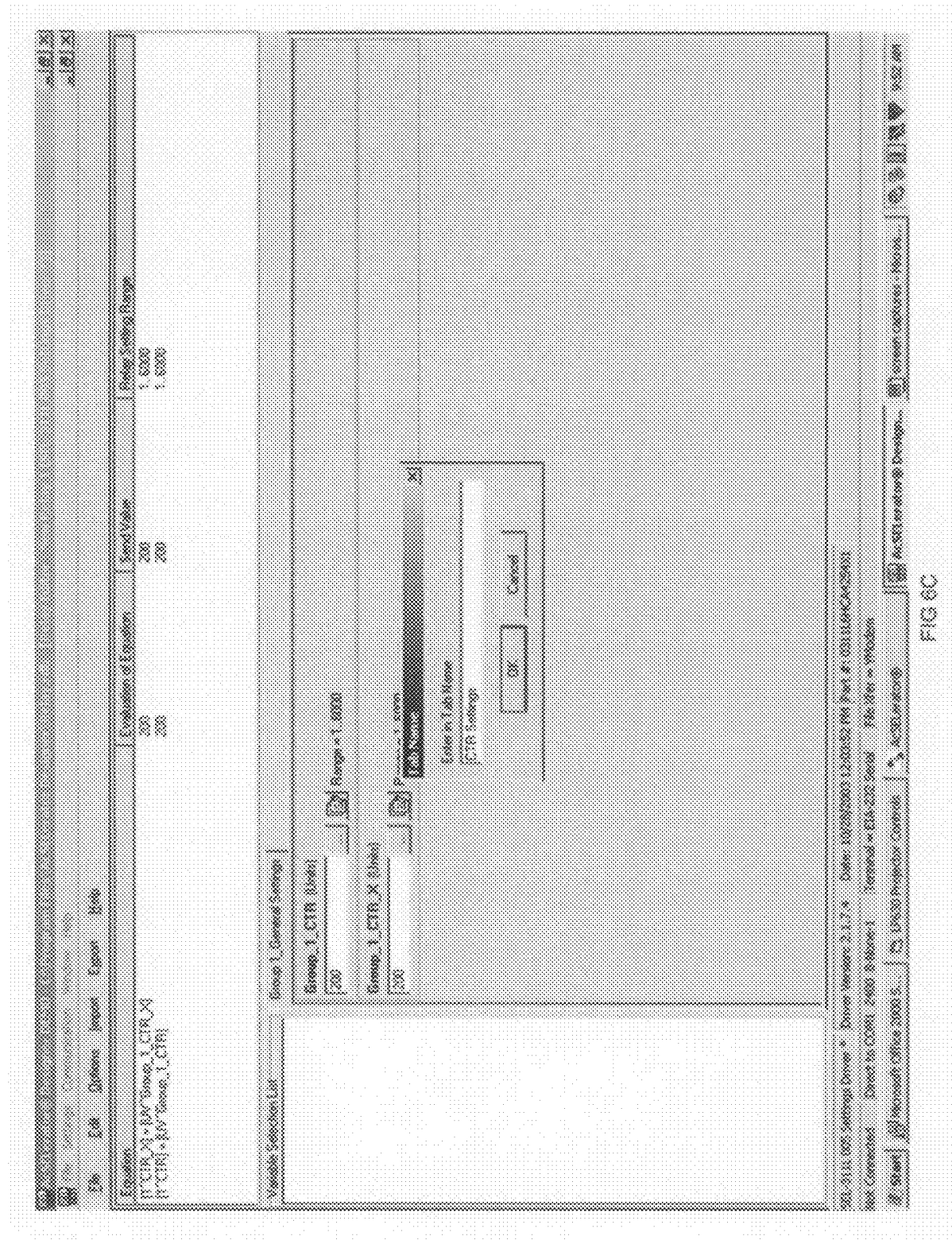
Figure 6D:
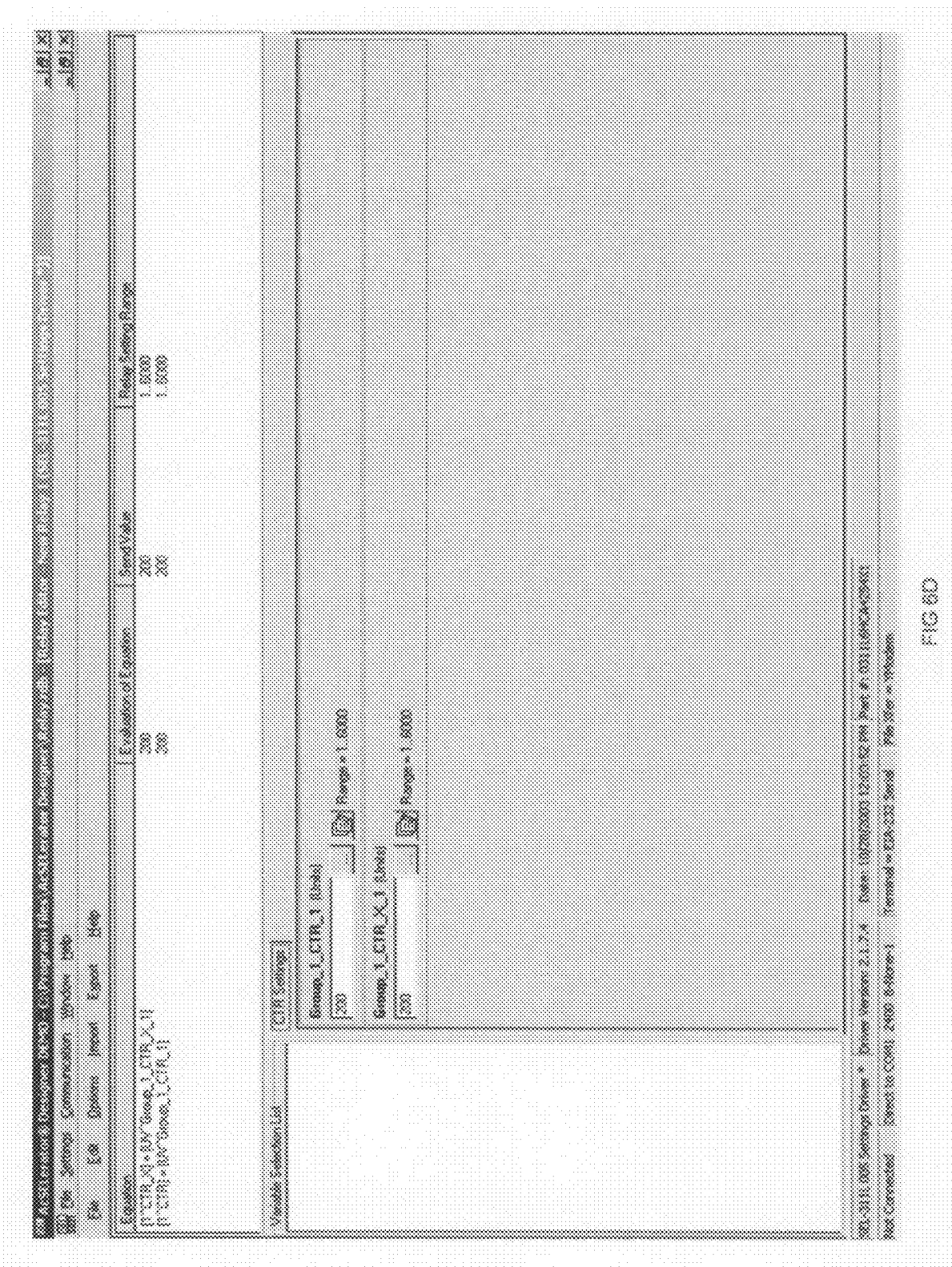
Figure 6E:
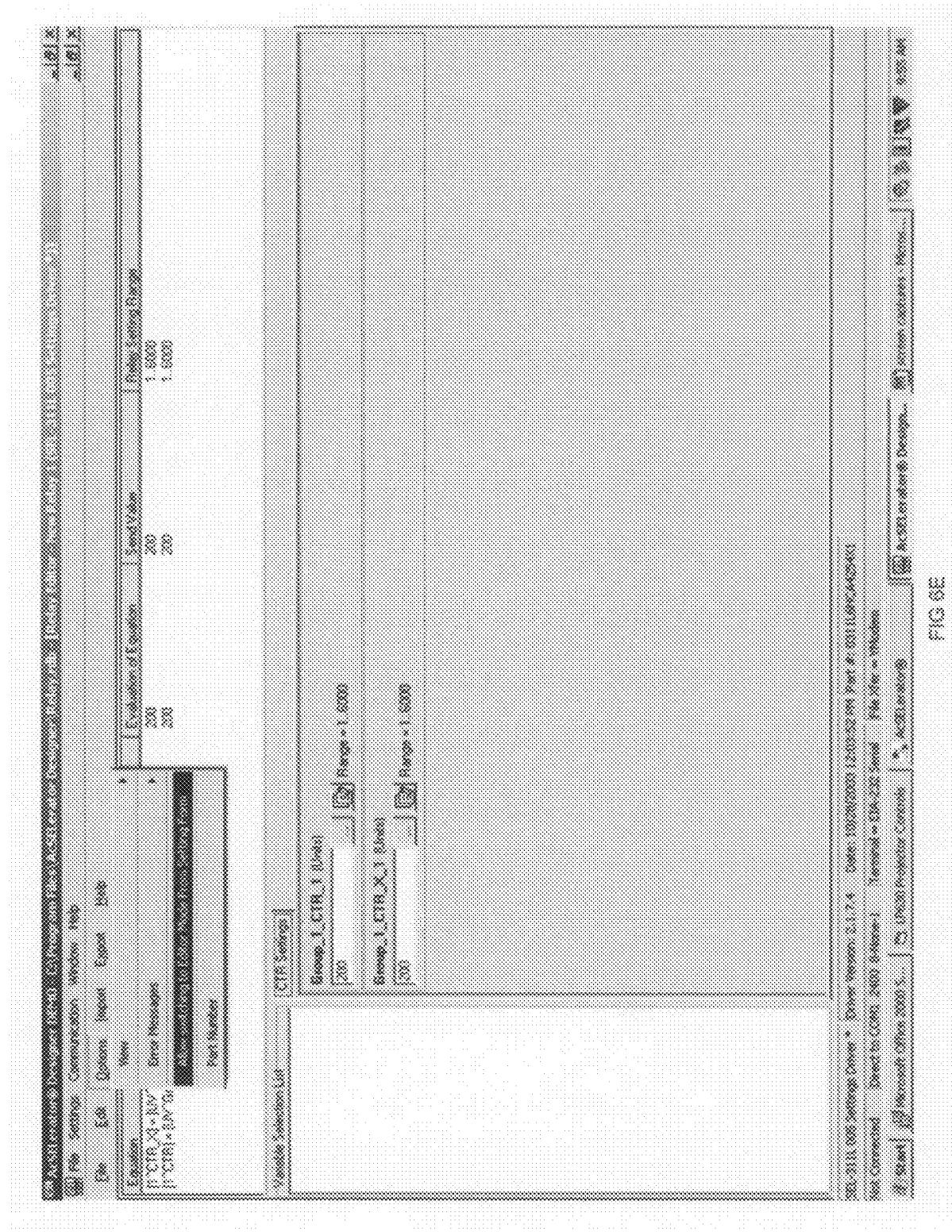
Figure 6F:
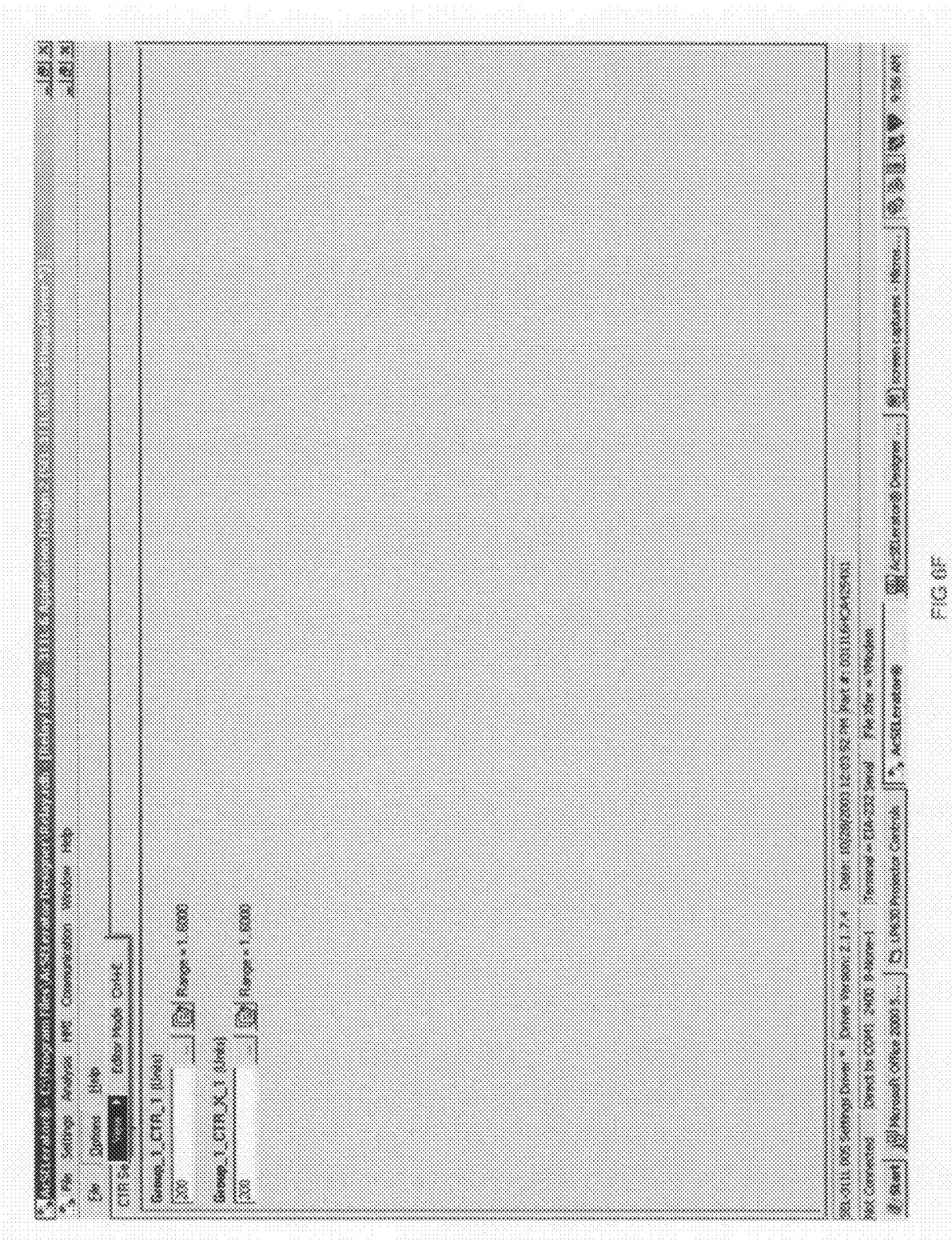
Figure 60:
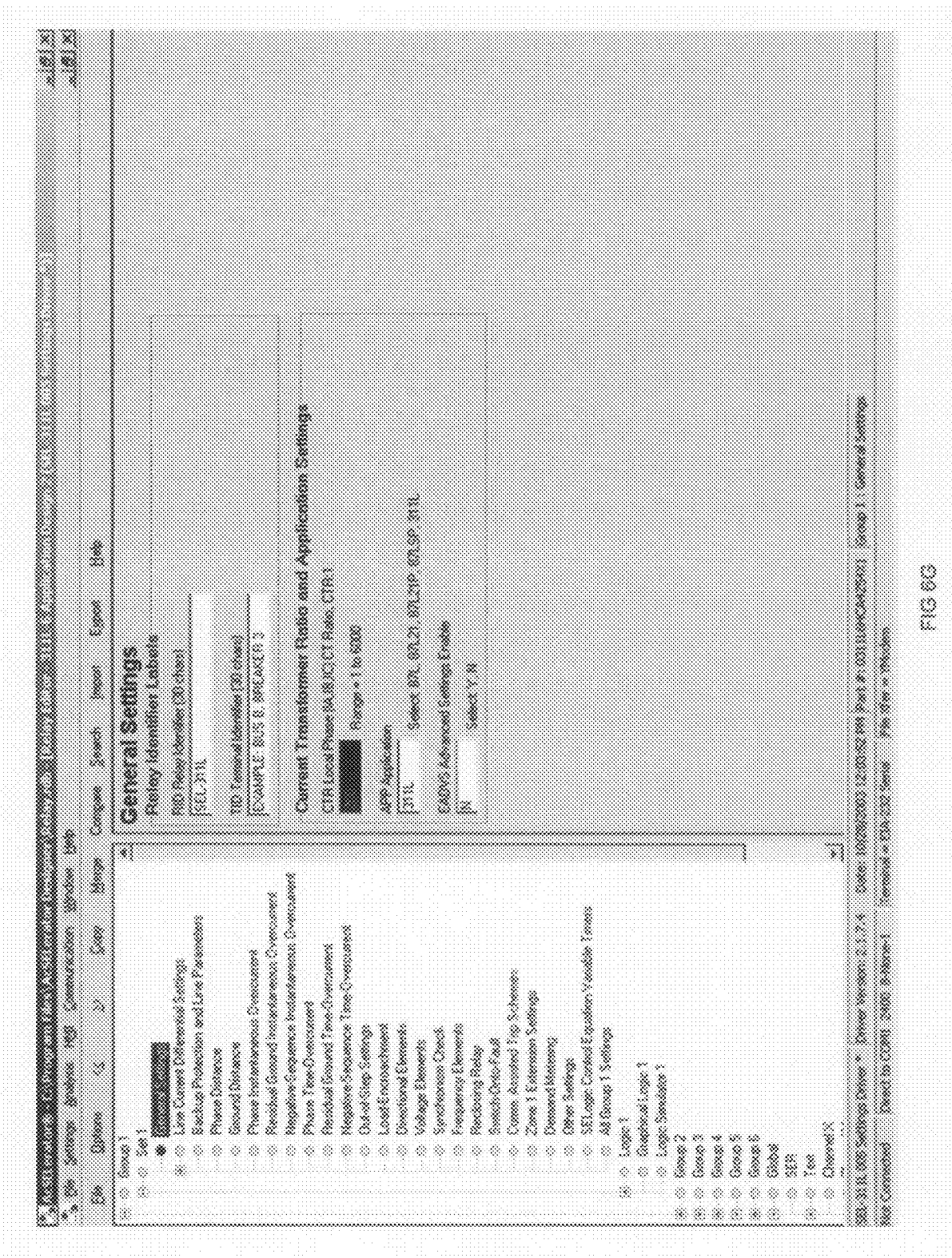
Figure 6B:
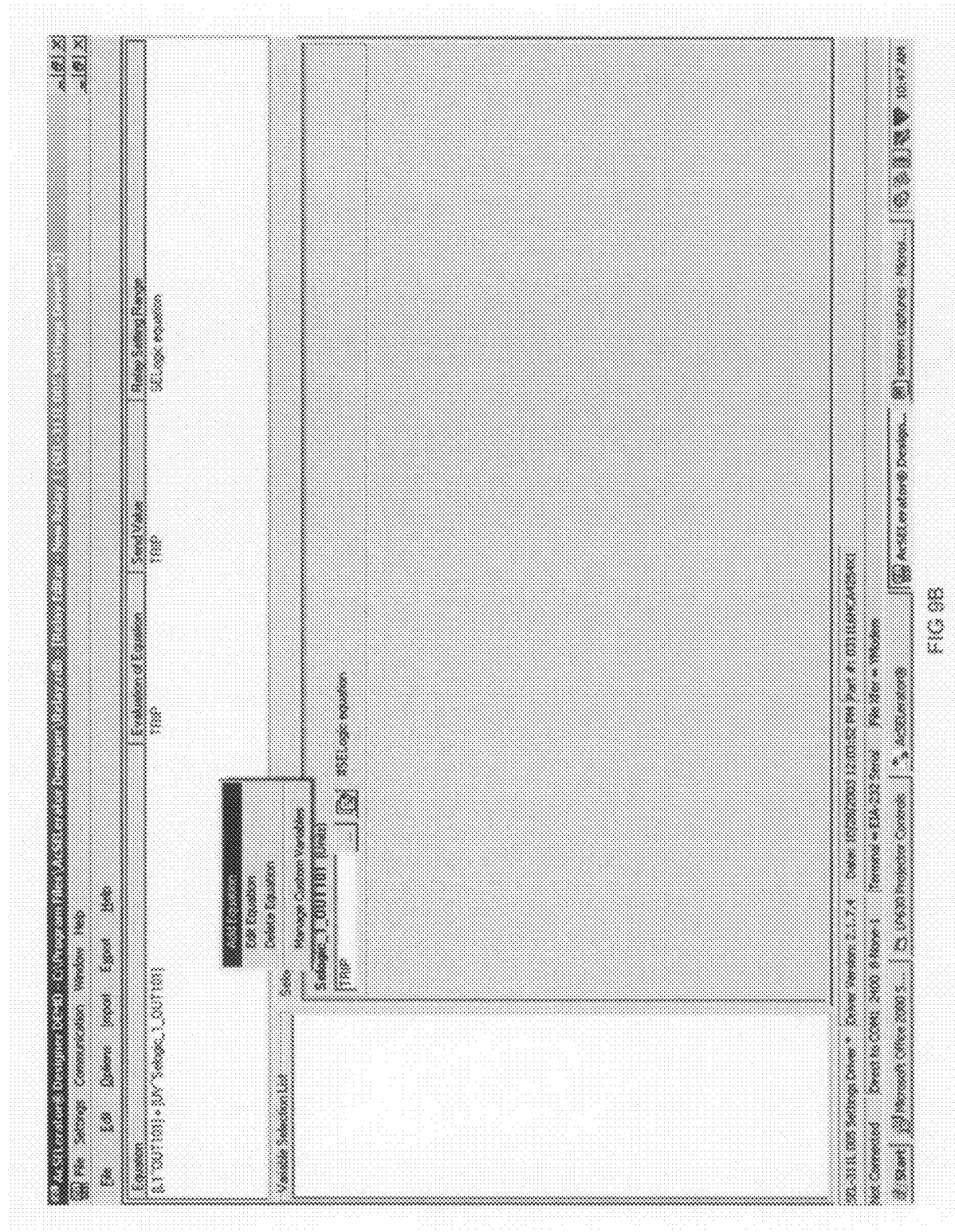

As illustrated in FIG. 6B, the engineer then navigates to and selects the second relay setting to be regrouped. In this case, the second relay setting is named "CTR_X" and is located within the "Group 1" group, "Set 1" category and "Line Current Differential Settings" sub-category.

The engineer then inputs or selects the appropriate commands (e.g., Options, View, Application Design menu selections) to switch to a design view made available by the editor software. In the design view, the two relay settings to be regrouped (CTR and CTR_X) are grouped together. In the illustrated example of FIG. 6C, these two regrouped relay settings are contained within the same tab common in conventional graphical user interface systems. In this example, the default group name positioned on the tab is "Group 1_General Settings", as shown in FIG. 6C.

To make these regrouped settings even easier to find by the technician, the engineer can change the group name, as desired. For example, the engineer can position the mouse pointer over the tab name and depress the right button on the mouse. In response to these commands, the editor software can present a drop-down menu. In this example, one of the menu selections can permit renaming of the group/tab. The engineer can select this menu selection and is then presented with a dialog box, illustrated in FIG. 6C, enabling the engineer to change the group (or tab) name, in known manner. In the example shown in FIG. 6C, the engineer desires to change the group name to the more user-friendly term "CTR Settings," and FIG. 6D illustrates the regrouping and the renaming thereof upon completion of this process.

Thereafter, the engineer may input the appropriate commands to allow the technician access to all other relay settings. FIG. 6E illustrates one illustrative way of achieving this result. In this case, the engineer inputs the "Options, Allow Switching to Editor Mode from Setting Form" menu commands.

As before, upon creating the application design file related to the settings for the customized settings management user interface, the engineer can save the file to the storage unit contained within the first computer, such as through use of the conventional "File, Save As" menu commands. In addition, the engineer can send the resulting file to a technician via electronic mail, over a local area network, or in any other way known in the art. Likewise, the technician can download the resulting file.

Upon receipt of the resulting application design file, the technician is then able to access it and open the customized settings management user interface through the display software for conduct of the in-field settings configuration process, as desired, and as described in prior examples. When the technician first loads the appropriate application design file for the customized settings management user interface to be used, the renamed regrouping is presented along with the two relay settings in that regrouping (CTR and CTR_X), as partially shown in FIG. 6F. The technician can configure these two settings at this location by entering the appropriate values for those settings in the value fields associated therewith. FIG. 6F illustrates a settings mode for the user interface.

At this point, the other relay settings are hidden from the view of the technician. Nonetheless, the technician has been granted access to view and configure those other settings. To view them, the technician inputs the appropriate commands to accomplish that task, and causes the user interface to switch from the settings mode illustrated in FIG. 6F to the editor mode illustrated in FIG. 6G. An example of the appropriate commands is an "Options, View, Editor Mode" menu command, as illustrated in FIG. 6F.

Referring to FIG. 6G, in the editor mode, the technician can navigate through the hierarchical system to select and configure any of the relay settings. Preferably, however, the technician cannot select and configure either of the two relay settings now located within the regrouping created during the application interface design process. In that regard, FIG. 6G shows that the application design has caused the value field for relay setting "CTR" to be highlighted in the editor mode, indicating that it cannot be modified in the editor mode. The same would apply for the other setting in the regrouping, namely the "CTR_X" relay setting.

EXAMPLE 4

In this example, the engineer uses the editor software to add an equation to determine a setting value. In this example, it is desired that the values of the two current transformer ratio settings identified in the prior example (CTR and CTR_X) are always equal.

To ensure that the two relay setting values are always equal, the engineer wants to have a single setting identifier for both settings presented to the technician during the field settings configuration process. There, the technician will enter the appropriate value for the settings, and the settings will be configured to have that value.

During the application design process, the editor software automatically generates equations that represent each of the relay settings to be included within the application design file. These equations preferably take the general form of [1^Setting_Name]=[UV^Custom_Variable_Name]. Therefore, in this case the equation related to the CTR relay setting is [1^CTR]=[UV^Group_1_CTR] and the equation related to the CTR_X relay setting is [1^CTR_X]=[UV^Group_1_CTR_X].

In order to ensure that the CTR and CTR_X relay settings always have the same value, the engineer needs to change one of those two equations so that both equations then define the settings to have the same value when input by the technician. In this example, the engineer needs to change one of the equations so that its right hand side is identical to the right hand side of the other equation. More specifically, the engineer will edit one of the two equations so that the same Custom_Variable_Name appears on the right side of both equations.

Figure 7A:
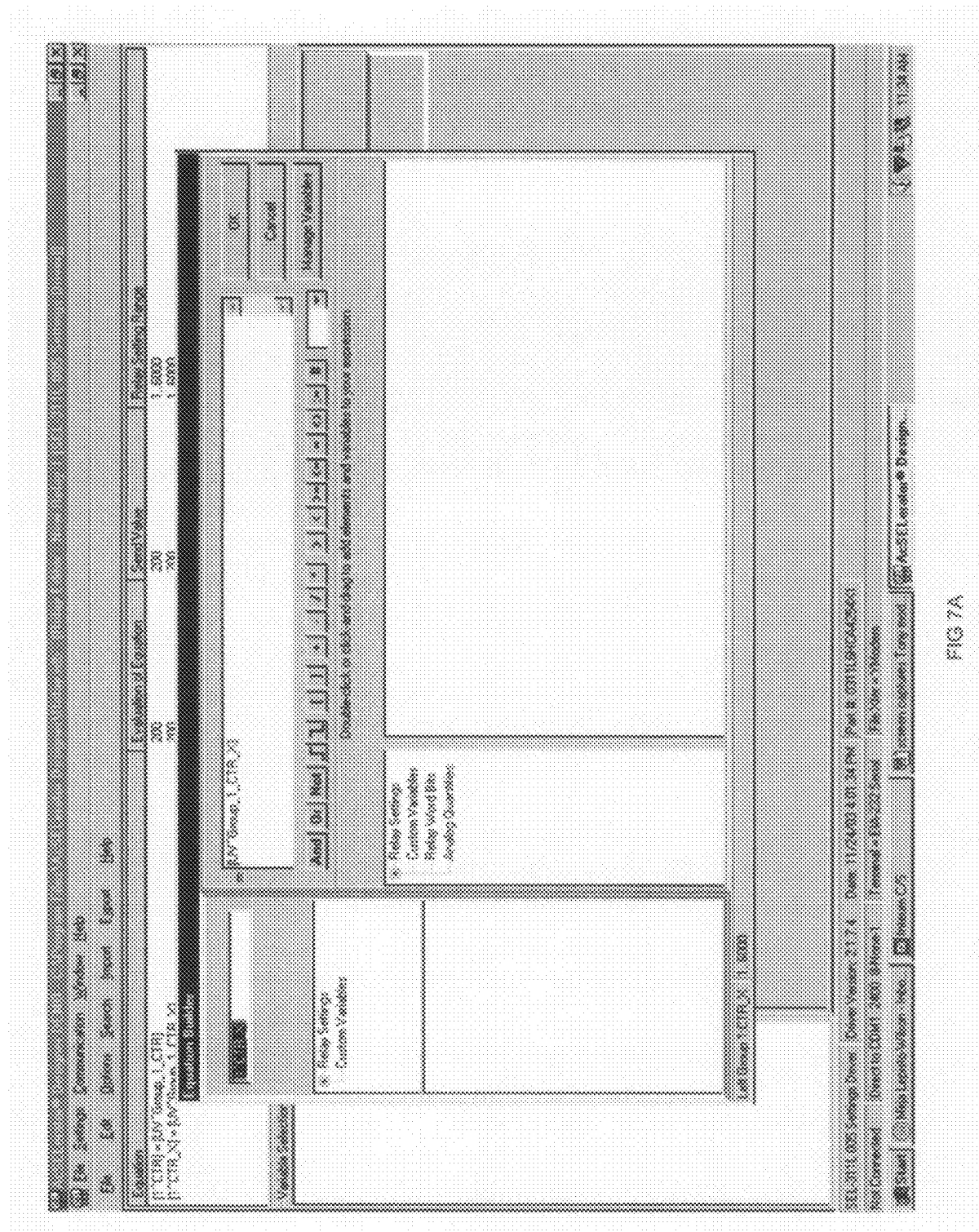
FIGS. 7A-7D are screen captures showing more functions of the system of FIG. 4.
Figure 7B:
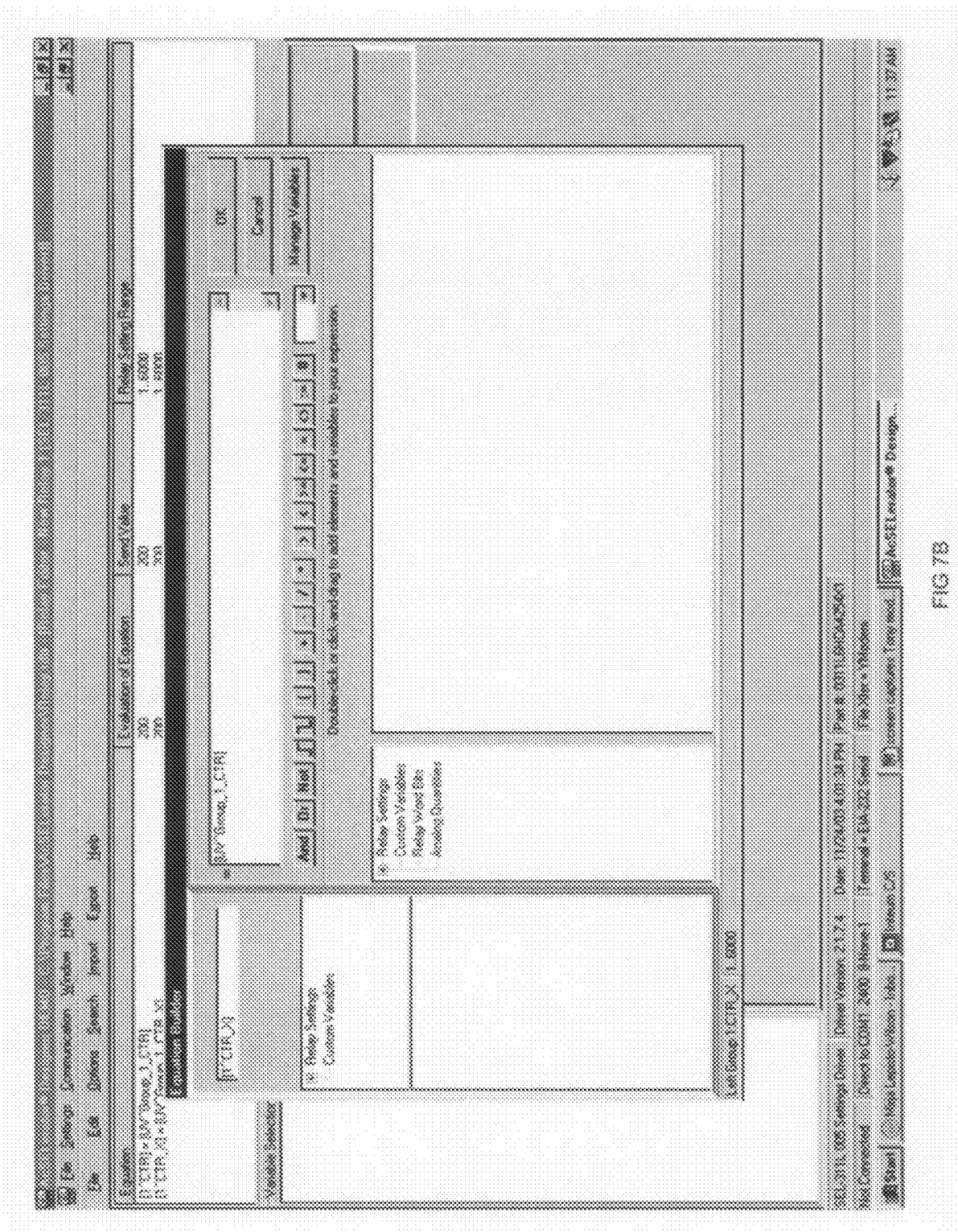
Figure 7C:
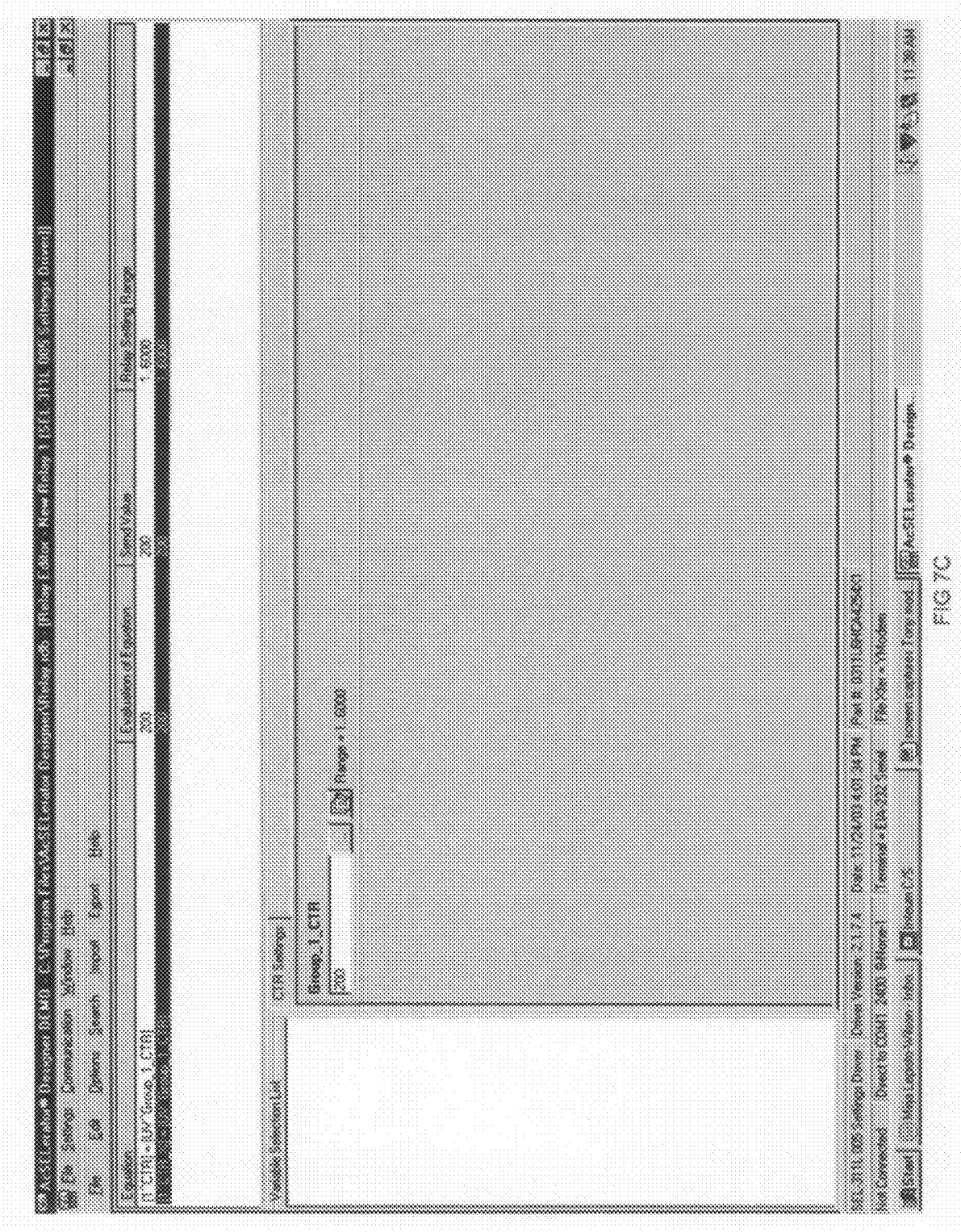

FIGS. 7A-7C illustrate a manner of carrying out this function. FIGS. 7A-7B illustrate an equation builder component included within the editor software. In this example, the engineer selects one of the equations by double clicking on it. As shown in FIG. 7A, in this example, the engineer has selected the equation related to the CTR_X equation. In response to this command, an Equation Builder screen is presented. The engineer then causes the right side of the equation to be changed from [UV^Group_1_CTR_X] to [UV^Group_1_CTR], as shown in FIG. 7B, and accepts that change by inputting conventional graphical user interface commands.

After the engineer accepts the changes made to the selected equation, the editor software detects that the selected equation, as previously defined, and particularly its right hand side, is no longer used on the right side of any equation associated with any of the relay settings. Accordingly, the editor software removes the panel associated with that custom variable so that the user interface no longer presents the setting for configuration by the technician. As a result, in this example, a single panel associated with the custom variable for CTR, i.e., UV^Group_1_CTR, is presented.

The engineer can save and then deliver the application design file, as in the prior examples. Thereafter, the technician can access the application design file during the field configuration process, as in the prior examples.

Figure 7D:
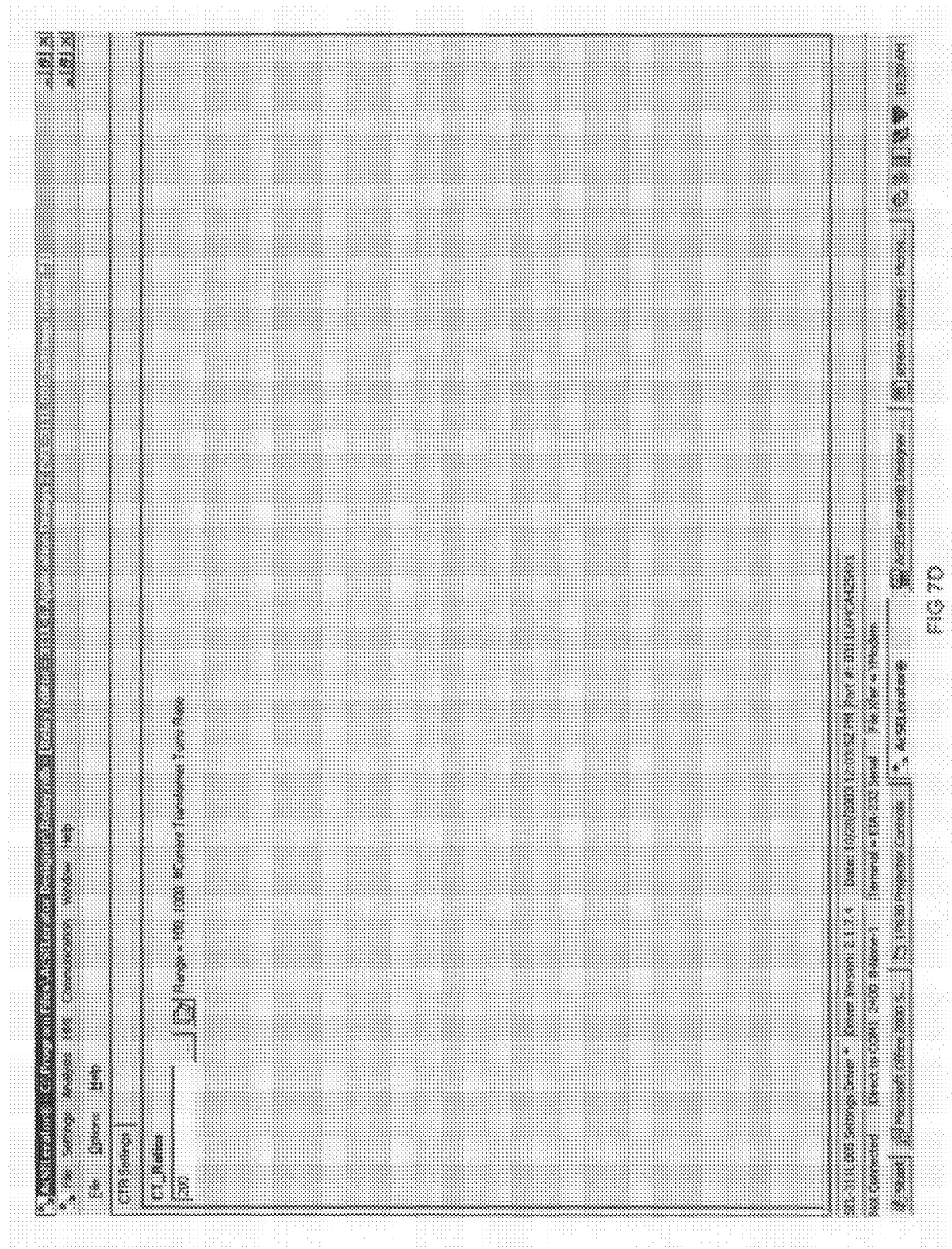

When using the display software, the technician can enter a single value into the value field (panel) associated with that relay setting, and both CTR and CTR_X will be set to that entered value, as illustrated in FIG. 7D. It will be noted that FIG. 7D illustrates that the name associated with the custom variable Group_1_CTR has been changed to CT_Ratios. The custom variable name change can be carried out in accordance with the techniques identified in prior Example 2. During the settings configuration process, the technician has configured the CTR and CTR_X settings to have a value of 200.

EXAMPLE 5

In this example, the engineer uses the editor software to provide for calculation of a setting value, as opposed to the assignment of a setting value as in the prior example. In this example, the engineer only wants to use current transformers rated for five amps secondary current, and prefers that the technician enter the nominal primary current when configuring the CTR and CTR_X current transformer ratio settings instead of the actual current transformer ratios. In this case, the engineer will design the application design so that it calculates the appropriate values for those settings from the primary nominal current entered by the technician.

Figure 8A:
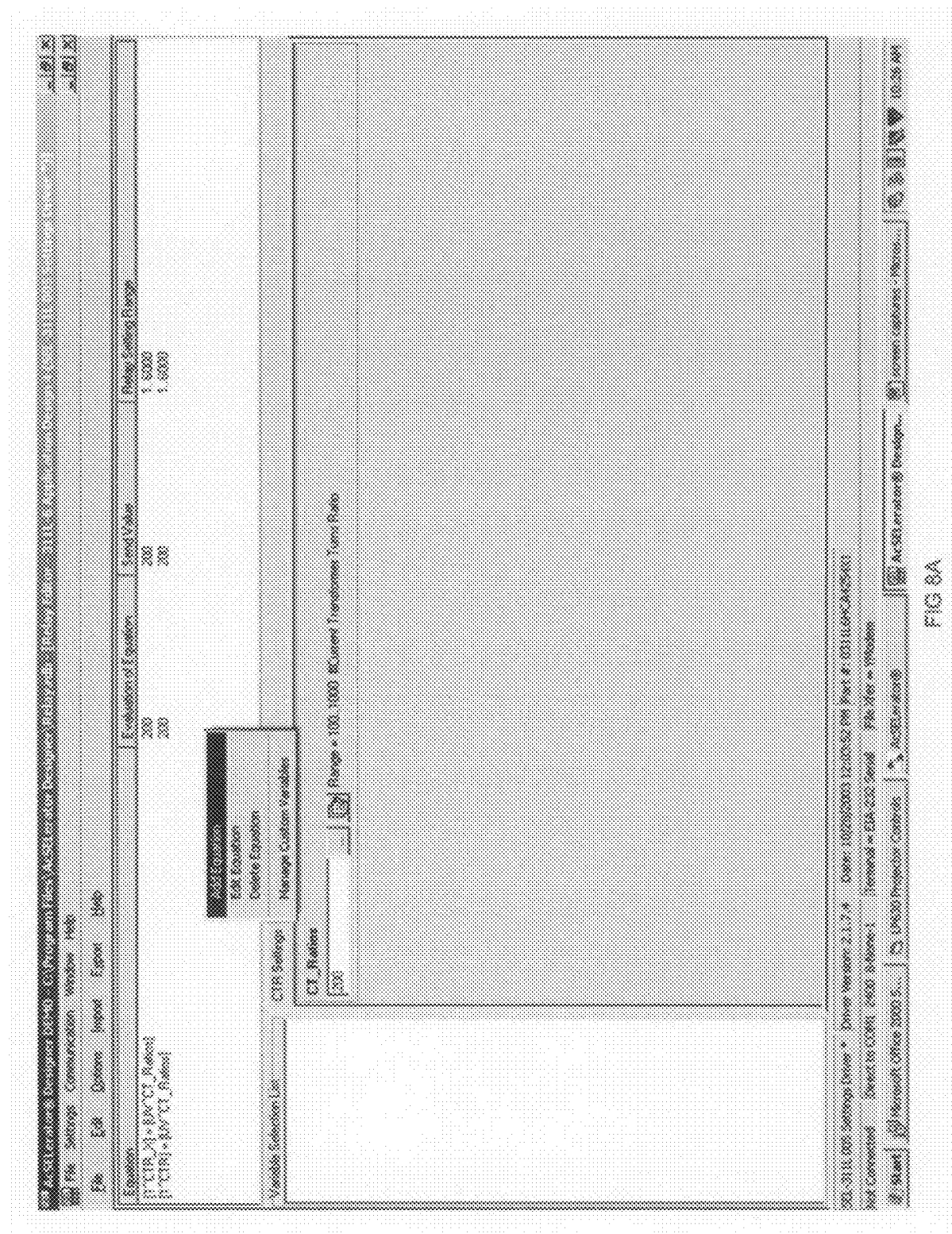

The engineer will add an equation that completes this calculation. Initially, the engineer will add a new equation to define this calculation. In this case, and as illustrated in FIG. 8A, the new equation is added by executing the appropriate commands, such as by positioning the mouse pointer at the appropriate location, pressing the right button on the mouse, and selecting the proper menu selection from the responsive drop-down menu presented by the editor software, in this case the "Add Equation" menu selection.

Figure 8C:
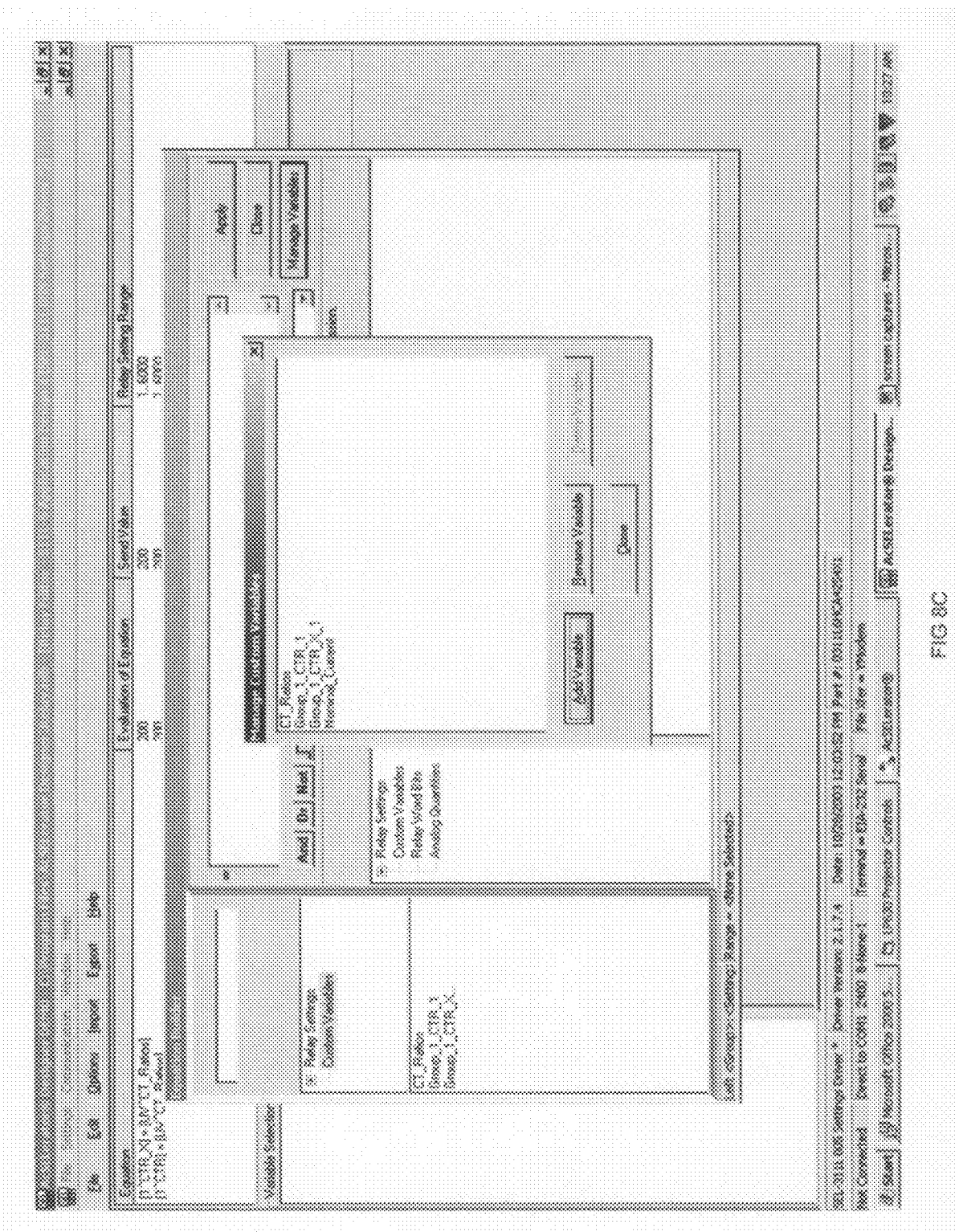
Figure 80:
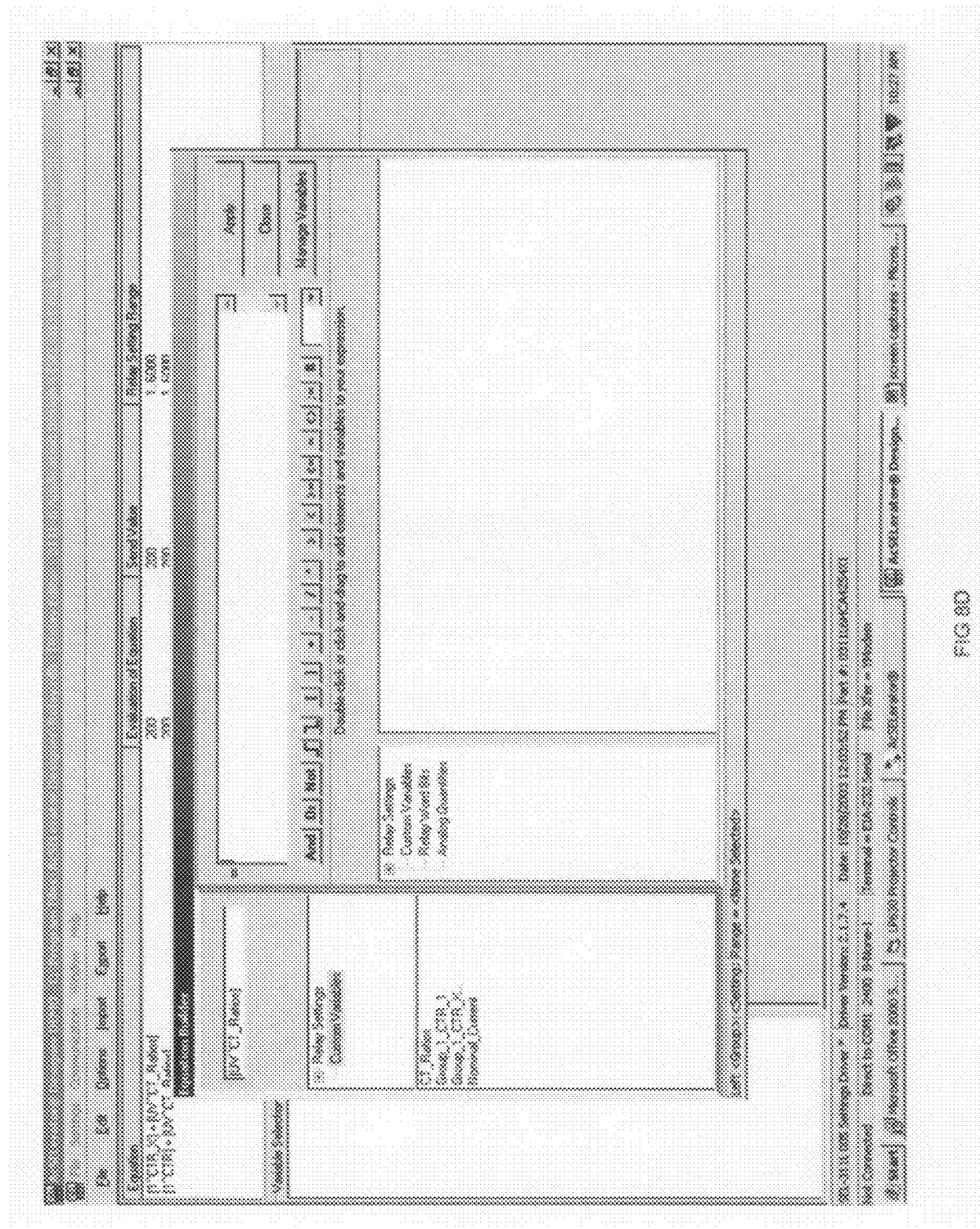

In response to this command, the editor software opens the Equation Builder screen, as shown in FIG. 8B. The engineer then creates a new user variable by clicking the "Managing Variables" button on the Equation Builder screen (FIG. 8B). In this example, the engineer then names that variable "Nominal Current", as shown in FIG. 8C.

The engineer then builds the resultant side of the equation, which is the left side in these examples and in the software illustrated in the Figures. FIG. 8D illustrates that the engineer has set the equation to calculate the user variable CT_Ratios defined in the prior example, which it will be recalled is the settings values for both of the CTR and CTR_X relay settings. The engineer can position the CT_Ratios user variable on the left side of the equation by executing known graphical user interface commands, such as by double clicking on the user variable or, alternatively, dragging it from its position in the panel to the left side of the equation in the Equation Builder screen.

Figure 8E:
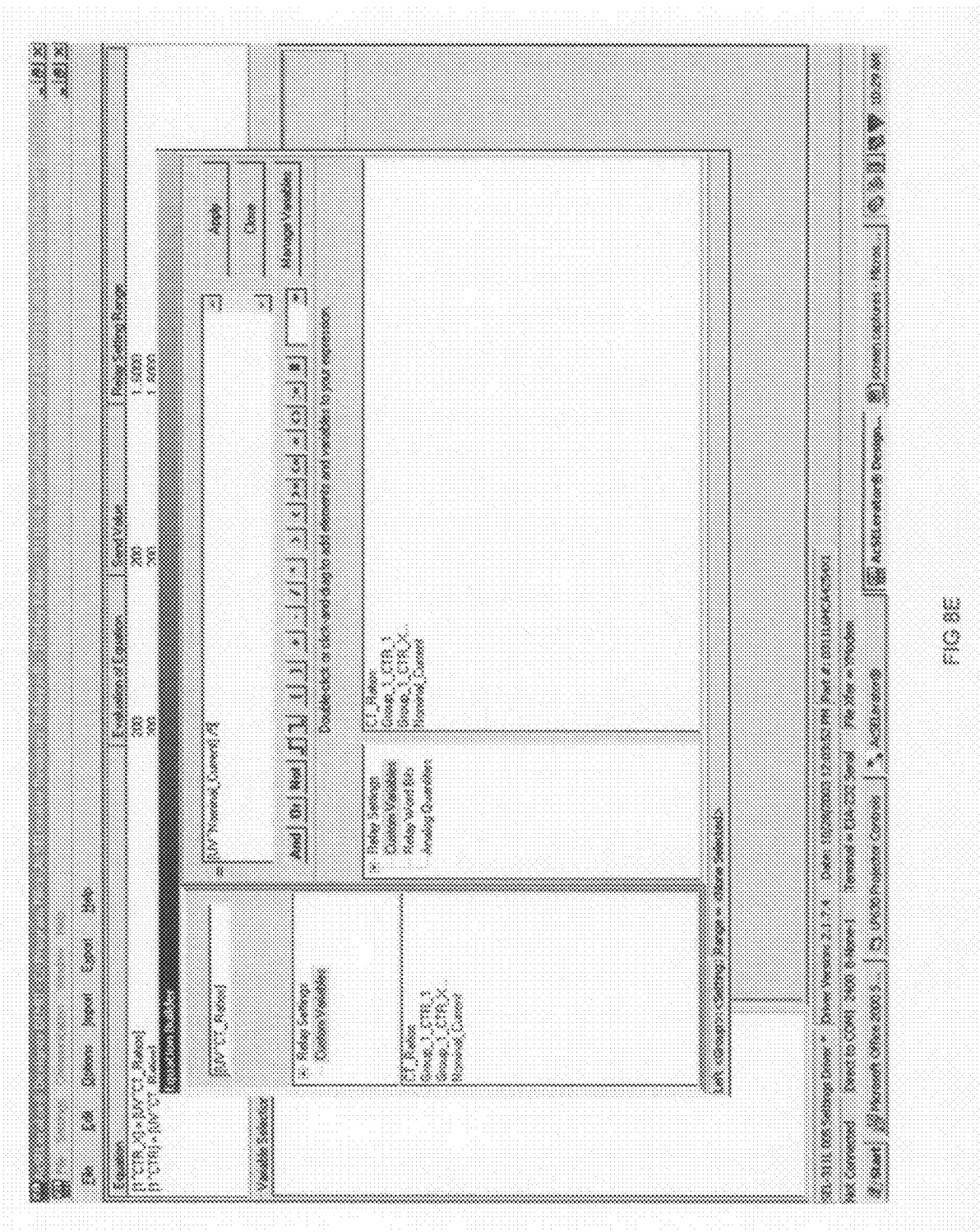

Thereafter, the engineer can build the right side of the equation, as illustrated in FIG. 8E. The engineer can select the "Custom Variables" selection in the middle panel of the Equation Builder screen to list the custom variables in the right panel. The engineer then selects the "Nominal_Current" custom variable from the list by executing the appropriate commands, such as by double clicking on it in known manner, or alternatively, by dragging it into the right hand side box for the equation built in the Equation Builder screen. In order to complete the equation, the engineer can type "/5" following the right side of the equation, as shown in FIG. 8E, to indicate that the Nominal_Current custom variable should be divided by five to calculate the CT_Ratio variable.

The engineer can then apply the equation to the application design and complete the equation building process by clicking the "Apply" button and then the "Close" button on the Equation Builder screen, shown in FIG. 8E. The engineer must then design the application design file to receive inputs from the technician related to the Nominal_Current variable during the settings configuration process, as indicated above in prior examples. The engineer can also customize the properties of the Nominal_Current variable, as indicated above in prior examples. The application design file is then saved and distributed to the technician, as indicated above in prior examples.

Figure 8F:
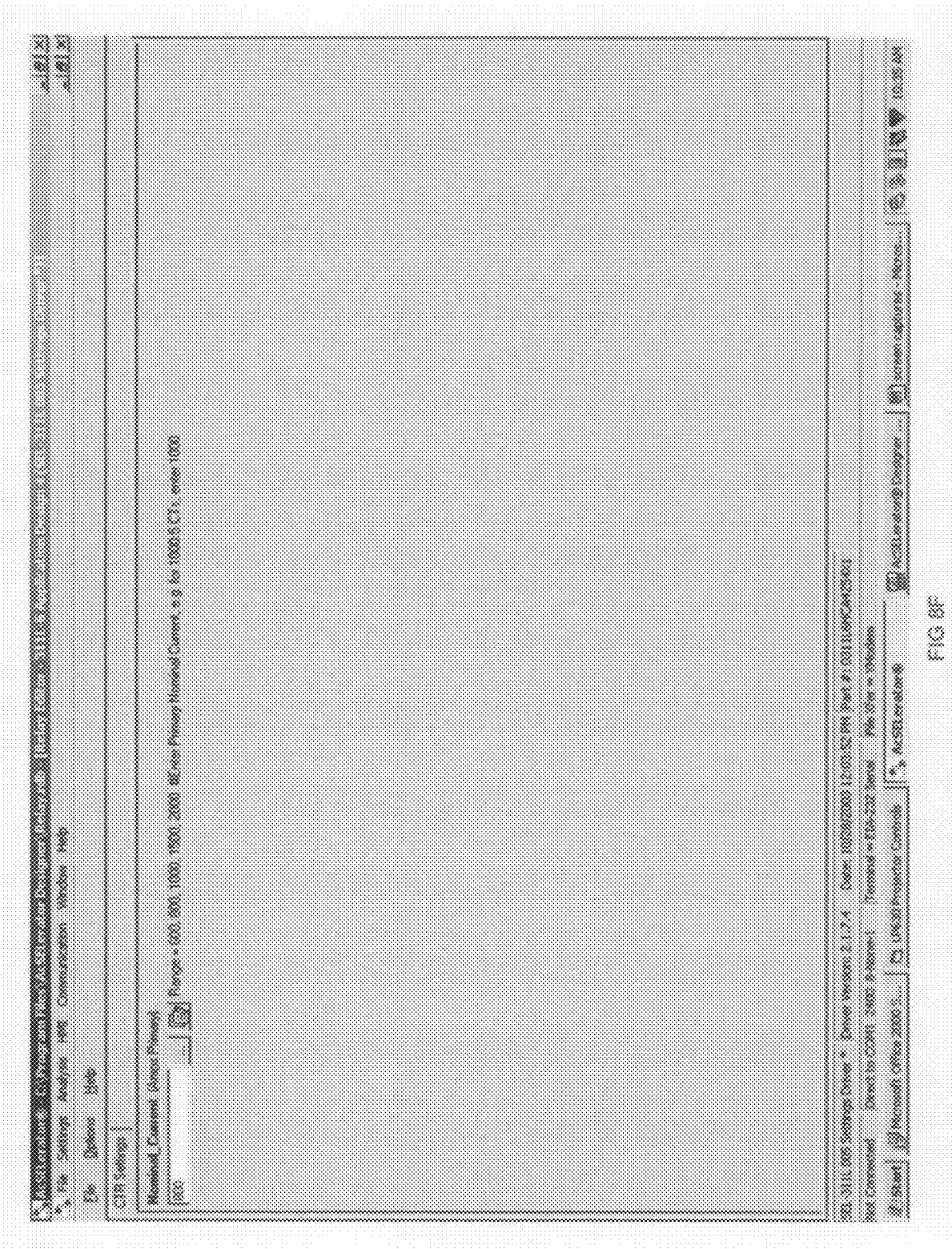

During the settings configuration process, and as illustrated in FIG. 8F, the technician will enter the Nominal_Current variable. From that entry, the CT_Ratio variable will be calculated and used to set the CTR and CTR_X relay settings to that calculated value.

EXAMPLE 6

In this example, the engineer customizes the view of logic equation settings. It will be assumed that the engineer wants the technician to be able to change how a contact output on the relay behaves for testing purposes. It is presumed that the relay output OUT101 is normally the tripping output for the relay. In this example, the engineer wants the technician to be able to change tripping output OUT101 so it is useful in testing the relay and also wants the technician to be able to readily change tripping output OUT101 back to a normal configured value, which is predetermined by the engineer.

First, the engineer navigates to the logic setting for tripping output OUT101 and adds it to the application design, as described in prior examples. The engineer then adds custom variables representing equations to be built corresponding to the tests to be conducted. In this case, the custom variables are Test_Overcurrent, Test_Overvoltage and Test_Undervoltage, as illustrated in FIG. 9A.

Figure 9C:
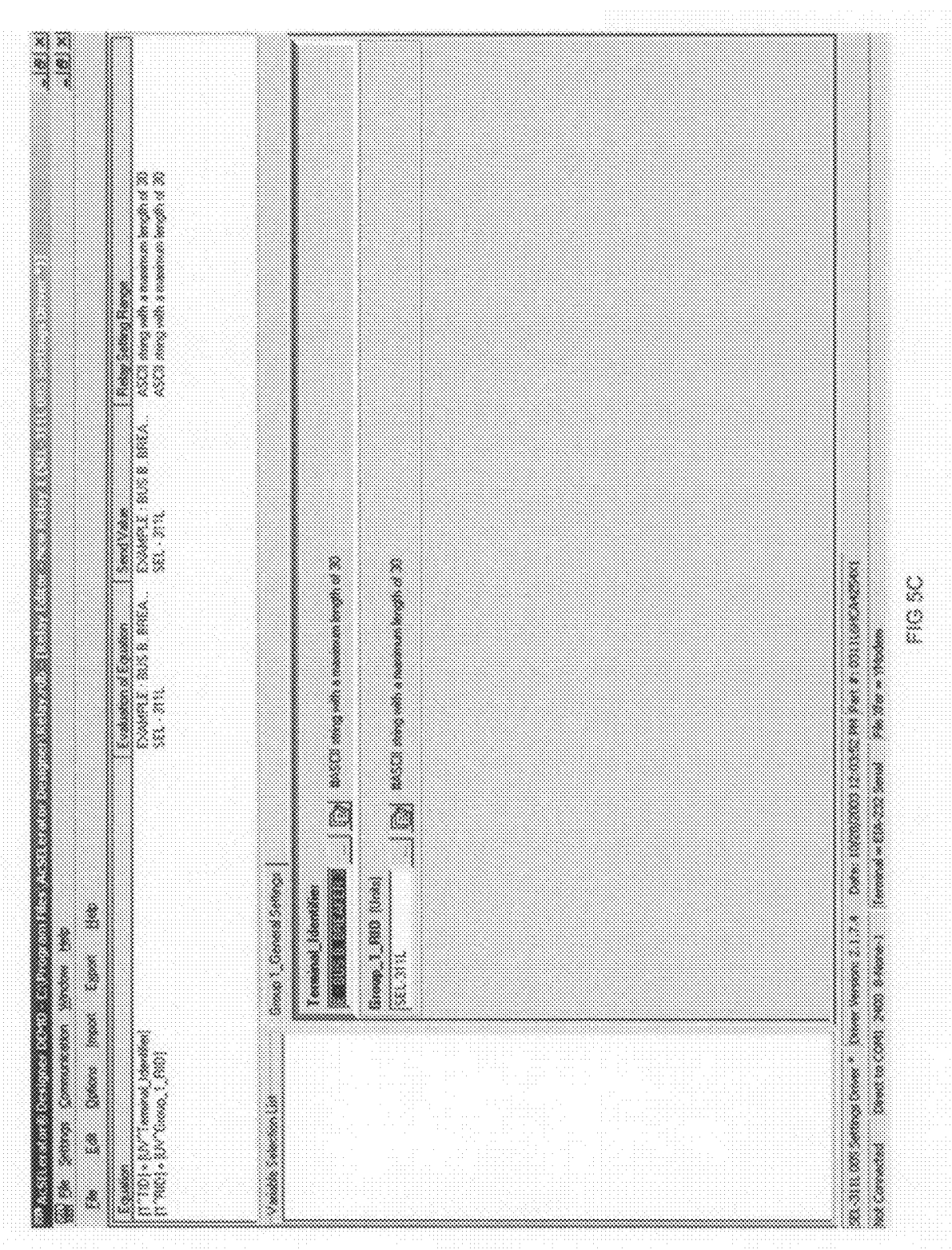
Figure 9A:
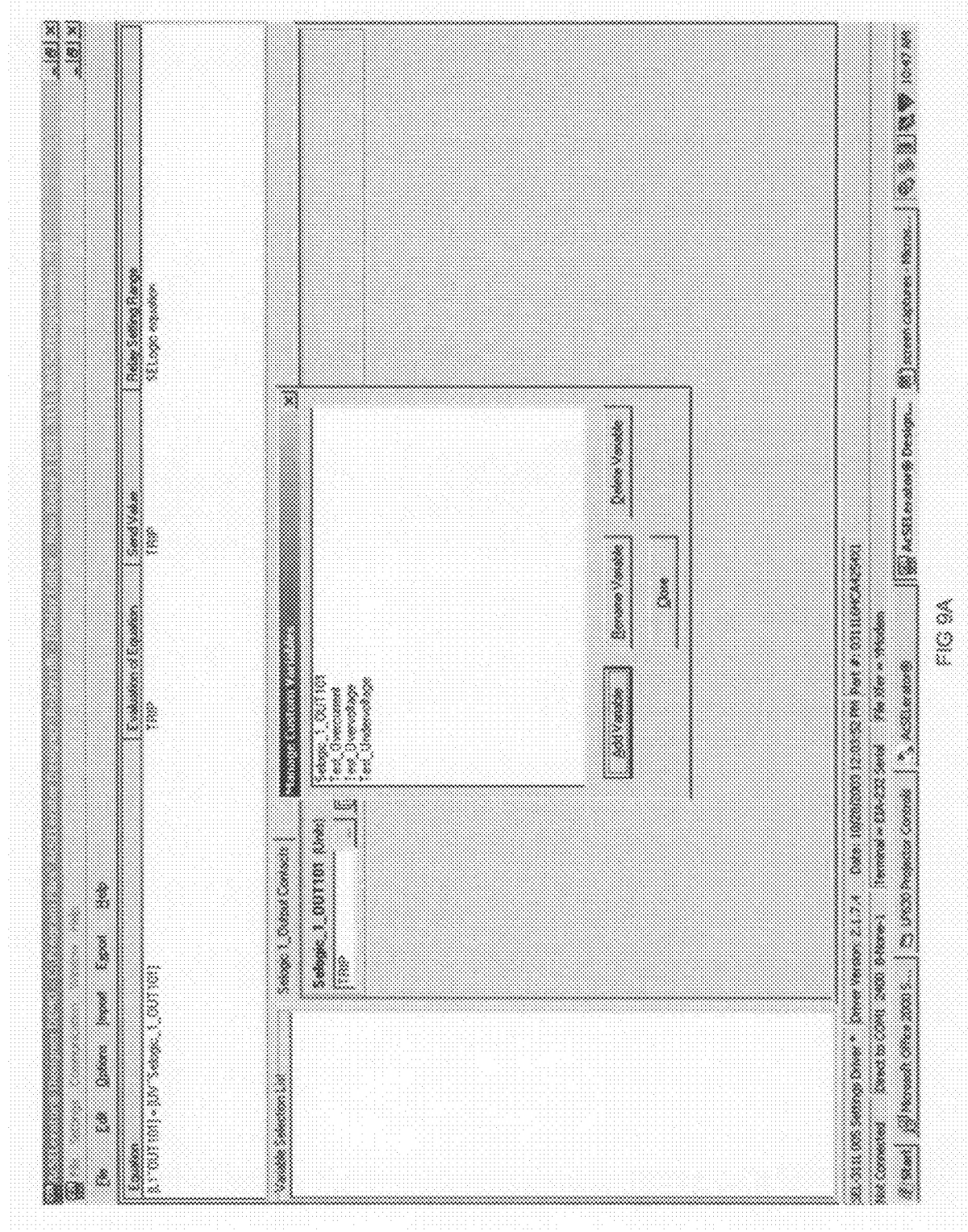

The engineer then initiates the equation builder process, as described in prior examples and in FIG. 9B. The engineer selects the Test_Overcurrent variable for the left side of the equation. As illustrated in FIG. 9C, the engineer selects the "Relay Word Bits" selection to view all of the possible binary logic points that can be used on the right side of the Boolean logic equation.

The engineer then builds the right side of the Boolean logic equation. In this case, the engineer builds the right side of the equation by selecting 51G then clicking on the "OR" button, then selecting 50P1, then clicking on the "OR" button, and then selecting 51Q. The equation is then built in the Equation Builder screen, as shown in FIG. 9C and as described above in prior examples.

Figure 9C:
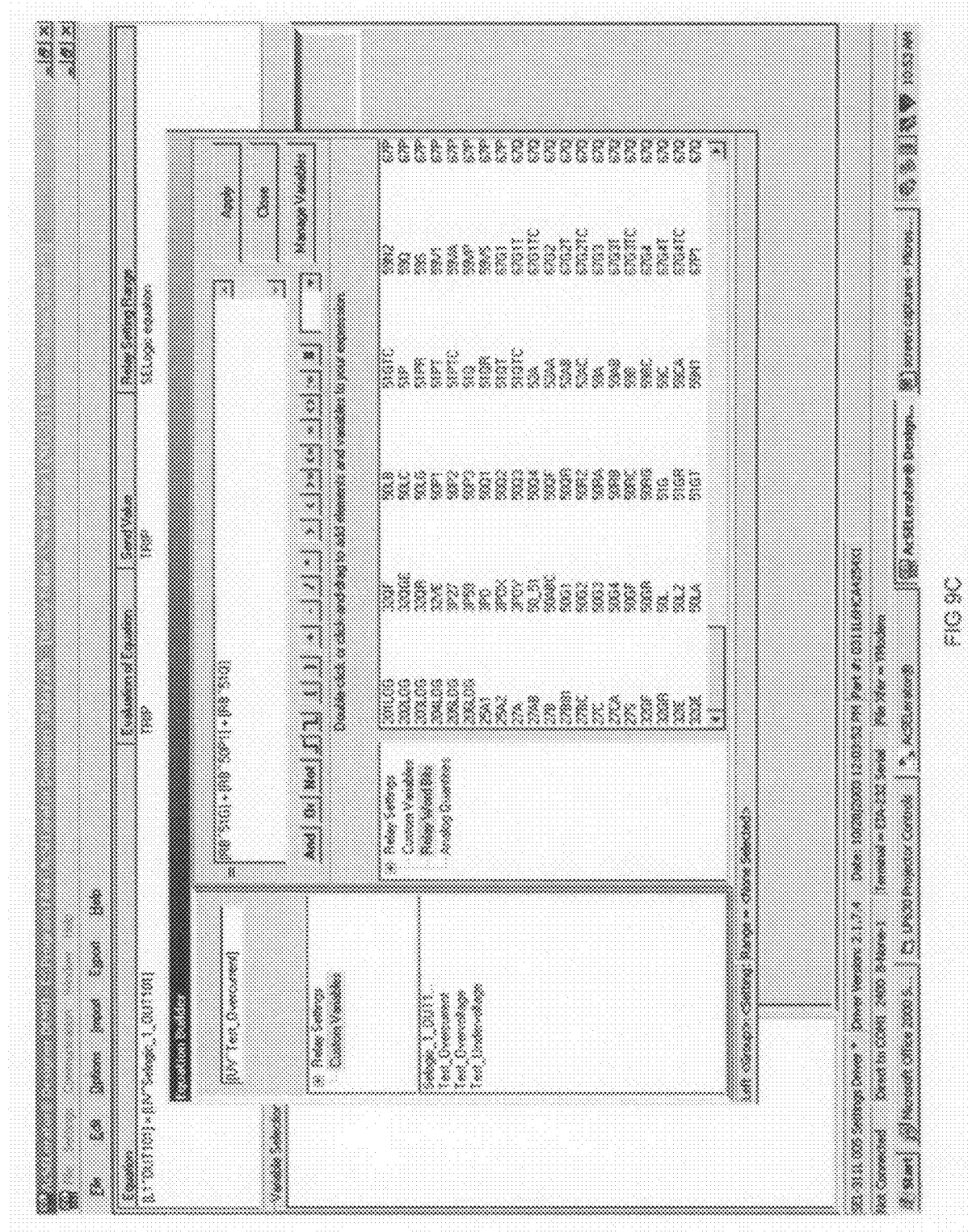
Figure 9D:
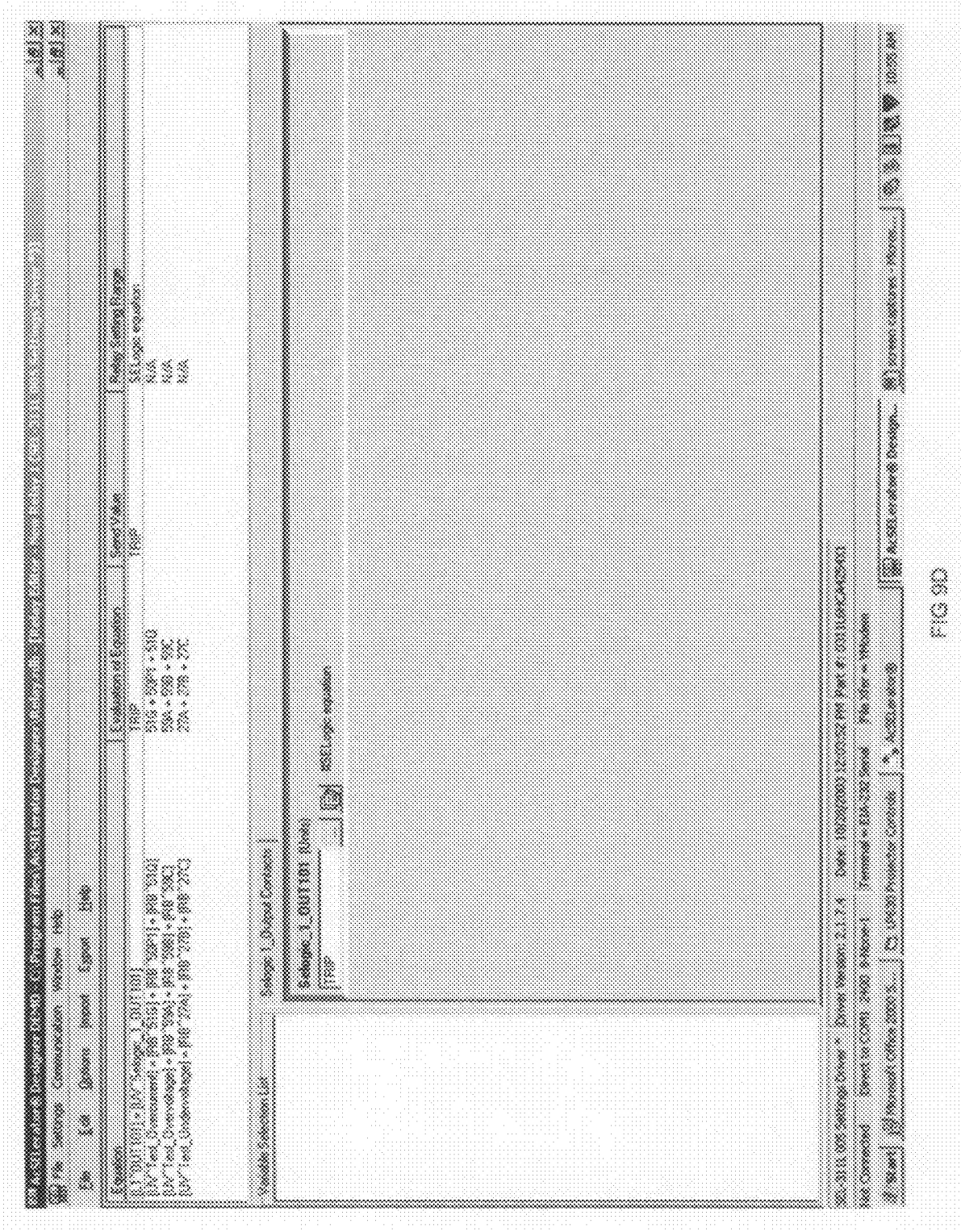

The engineer then builds similar Boolean logic equations to determine the logic states for custom variables Test_Overvoltage and Test_Undervoltage. Thereafter, the created Boolean equations are applied to the application design, as illustrated in FIG. 9D.

Figure 9E:
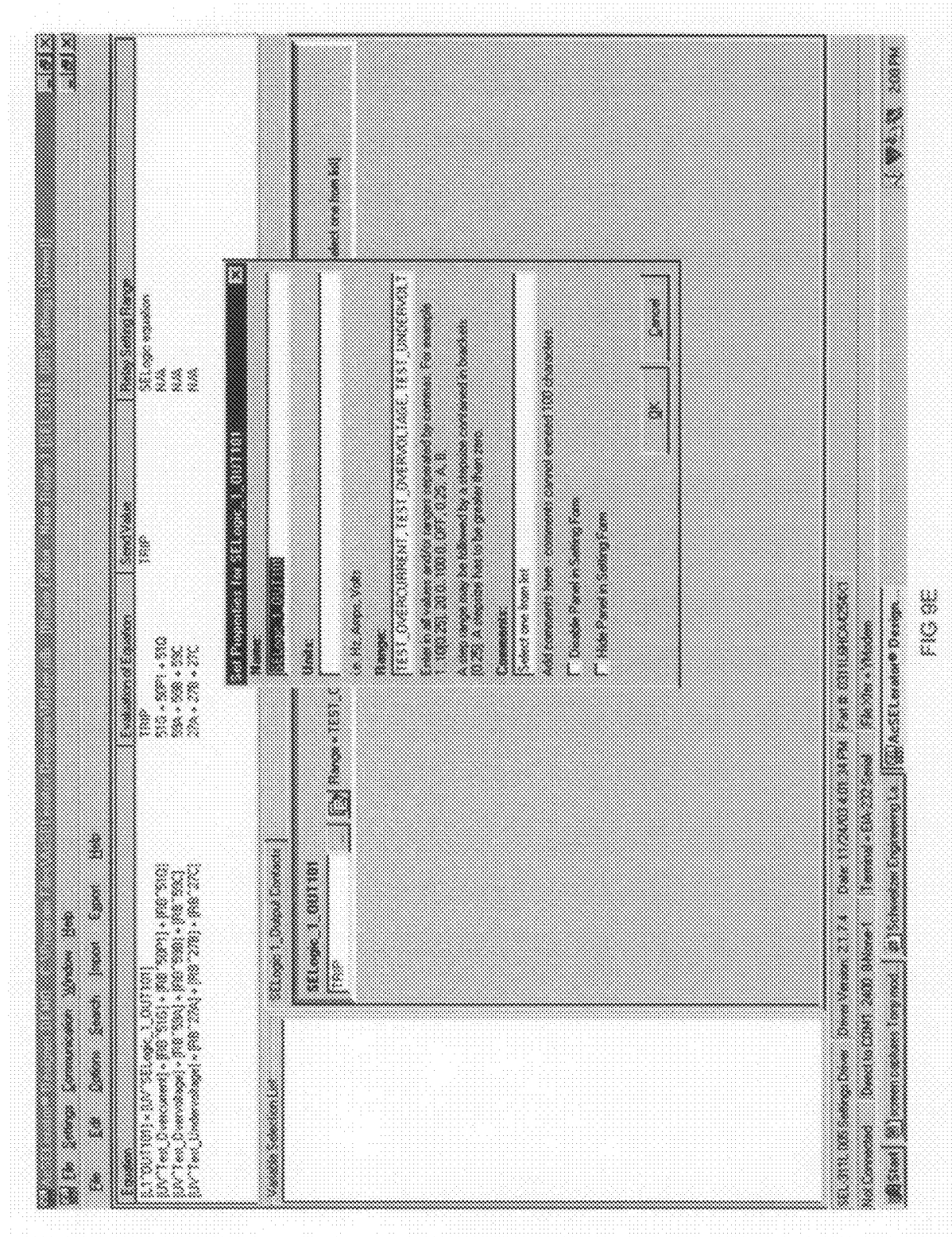

The engineer then modifies the settings for the trip output OUT101 setting in accordance with techniques described in prior examples. In this case, and as illustrated in FIG. 9E, the engineer blanks out the units field associated with the OUT101 settings and changes the designated range by enumerating a list to allow the technician to select from the created Boolean equations Test_Overcurrent, Test_Overvoltage, or Test_Undervoltage, or relay word bit TRIP. Preferably, the engineer adds the comment of "Select one from list" to provide directions and make the user interface more user-friendly for the technician.

Figure 9F:
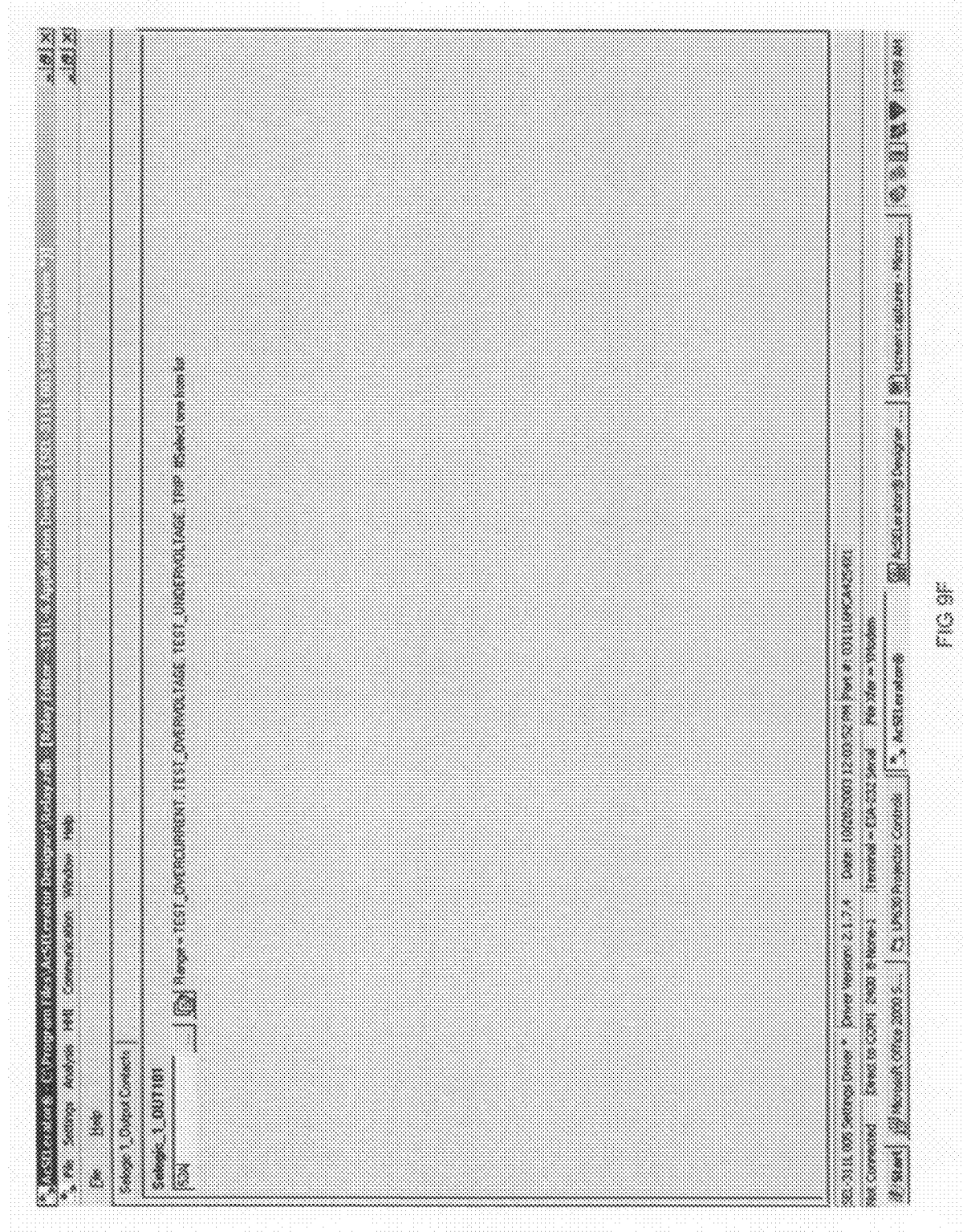

The engineer then saves the application design and it is later distributed to the technician for settings configuration in the field. FIG. 9F illustrates that when the technician opens the application design, a single setting related to the trip output OUT101 is presented and it is set to its default value of TRIP, as predetermined by the engineer. The choices to be selected by the technician are limited to those set forth in the range (see FIG. 9F).

EXAMPLE 7

Figure 10A:
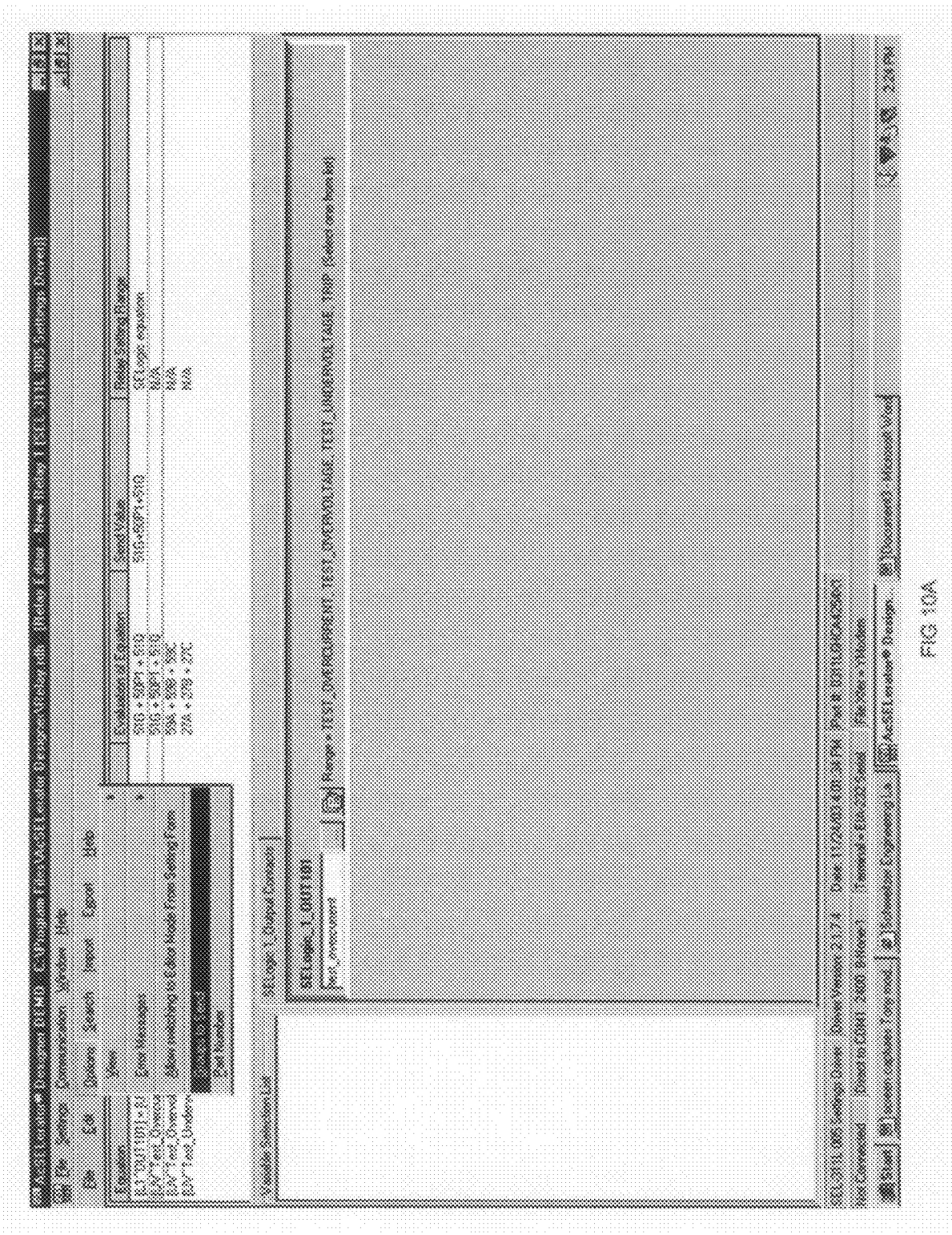
FIGS. 10A-10B are additional screen captures showing functions of the system of FIG. 4.
Figure 10B:
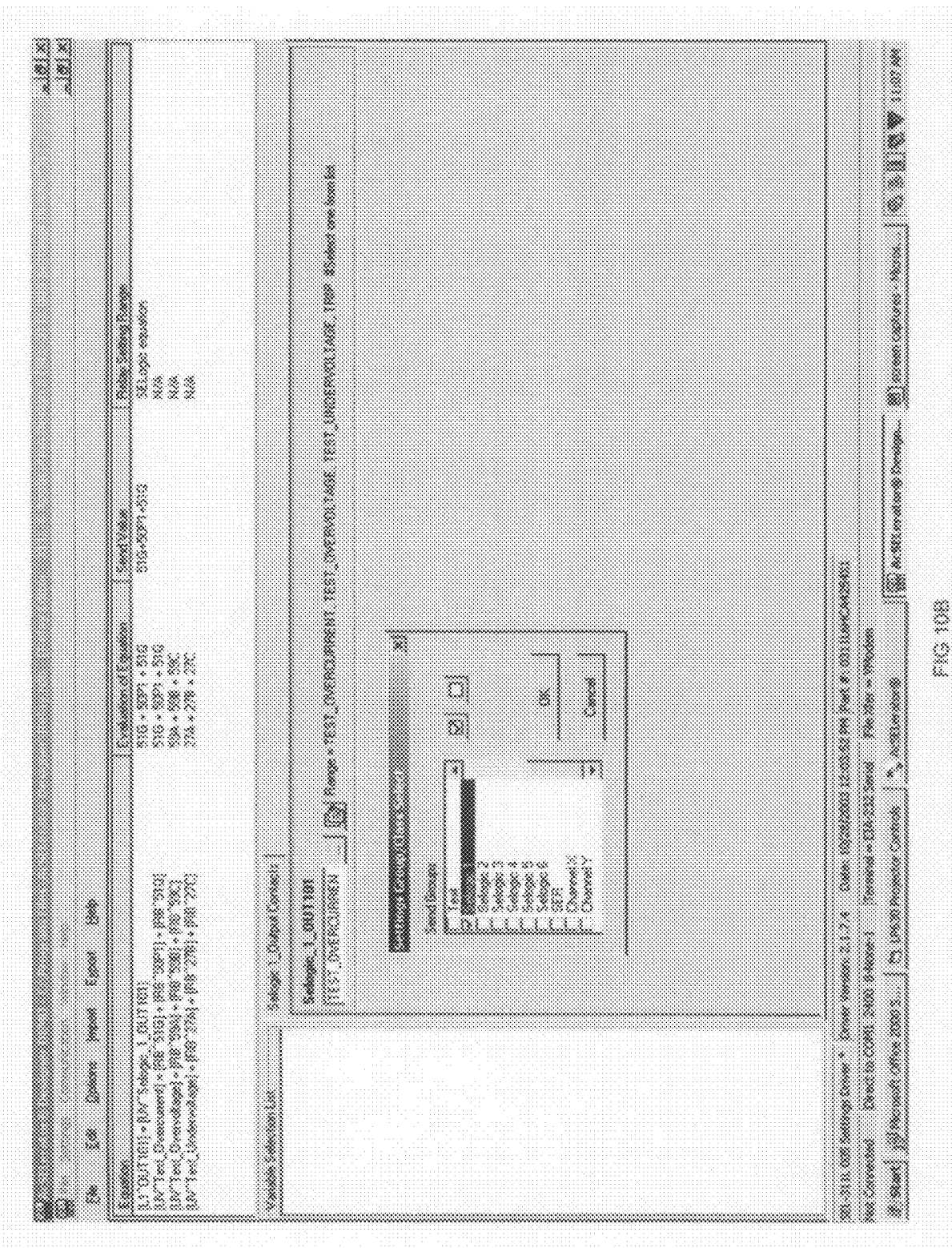

The engineer may further use the editor software to control which settings can be downloaded to the relay. In these instances, the engineer could give the technician complete access to all relay settings but only permit certain of those settings to be downloaded to the relay. In this example it is assumed that the engineer wants to limit the settings to be downloaded to only those that are contained within the group designated "Selogic 1", as illustrated in FIG. 10B.

In order to limit which settings are downloaded to the relay, the engineer creates a blank application design, and then permits only the settings contained within the Selogic 1 group to be downloaded to the relay. In this example, the engineer carries out this process through an "Open, Groups to Send" menu command, as illustrated in FIG. 10A. In response to that command, a dialog box is presented by the editor software and the engineer specifies the settings categories that can be downloaded to the relay when the technician conducts the field configuration process (see FIG. 10B). Only the settings in the selected categories will be able to be downloaded to the relay. Preferably, the settings download limitation is hidden from the technician.

EXAMPLE 8

In this example, it is desired to have the range for a configurable IED setting or variable to be scalable in real time based upon the value of another IED setting or variable. It is also desirable to have the scalable range displayed accurately in real time. The present invention advantageously provides this capability.

Figure 11A:
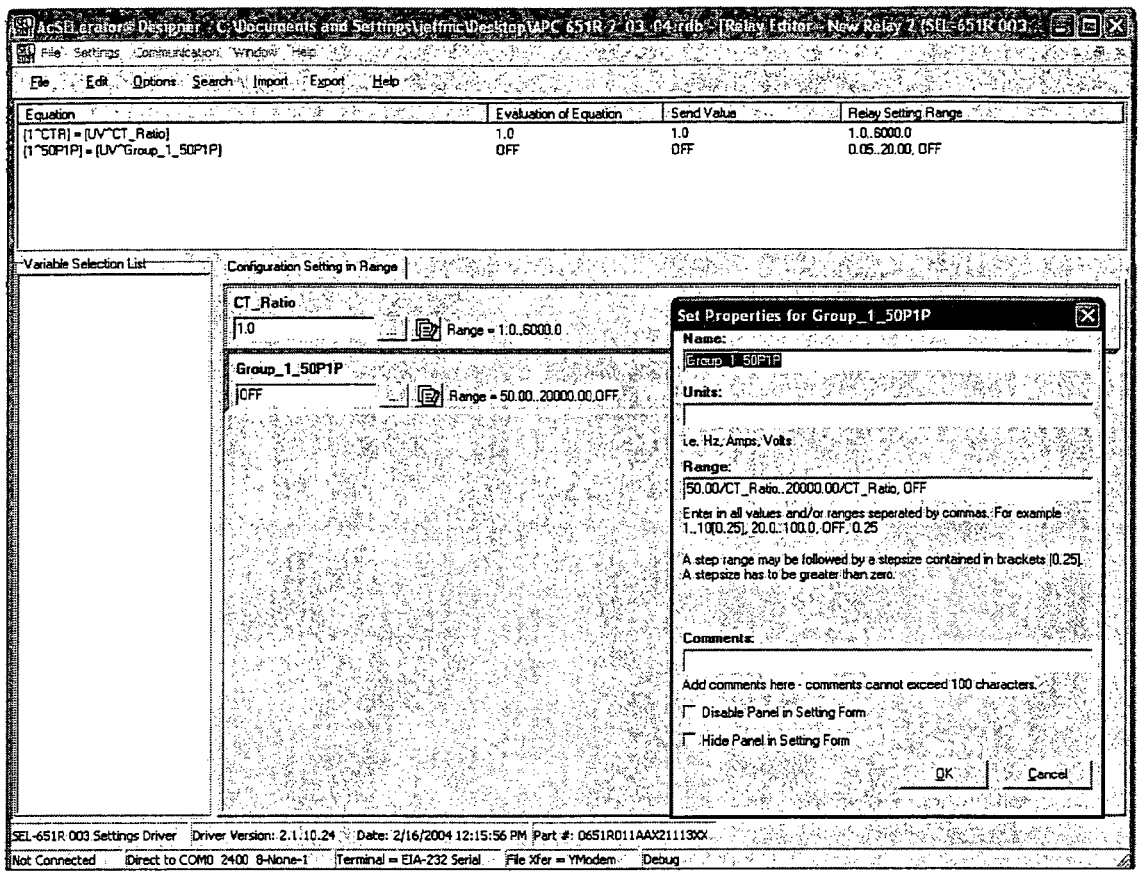
FIGS. 11A-11B are still additional screen captures showing functions of the system of FIG. 4.

As illustrated in FIG. 11A, the range for IED setting "Group_1_50P1P" has been defined so that two of its elements are based on the variable "CT_Ratio". In particular, the lower and upper limits of the range for Group_1_50P1P are dependent upon the value of the variable CT_Ratio. Here, in the illustrated example, the lower limit of the range for Group_1_50P1P has been defined to be fifty divided by the value of CT_Ratio, and the upper limit of the range for Group_1_50P1P has been defined to be twenty thousand divided by the value of CT_Ratio (see FIG. 11A).

In this example, where the CT_Ratio is set at one (as illustrated in FIG. 11A), the lower limit of the range for Group_1_50P1P will be fifty, and the upper limit of the range for Group_1_50P1P will be twenty thousand. Under these circumstances, the range is displayed as "50.00 . . . 20000.00, OFF", as illustrated in FIG. 11A.

Figure 11B:
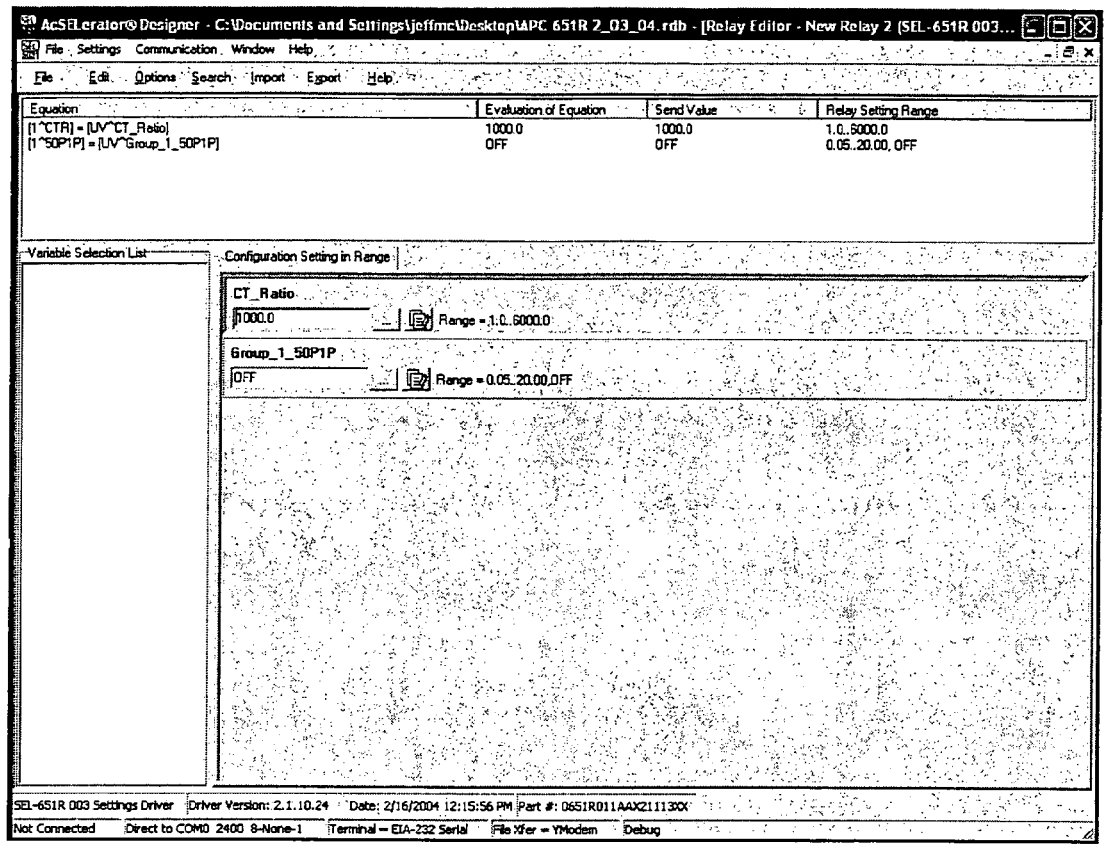

In another instance, where the CT_Ratio is set at one thousand (as illustrated in FIG. 11B), the lower limit of the range for Group_1_50P1P will be five hundredths, and the upper limit of the range for Group_1_50P1P will be twenty. Under these circumstances, the range is displayed as "0.05 . . . 20.00, OFF", as illustrated in FIG. 11B.

EXAMPLE 9

It is also desirable to be able to use comparison equations to determine a configurable IED setting, and to be able to use a comparison as a component of a mathematical, Boolean logical or other equation to determine the IED setting, as desired. The present invention advantageously provides this capability.

In this example, the engineer uses the equation builder functions illustrated and described in prior examples to define an equation having a comparison equation as a component thereof. Here, the equation builder screen is used to define the mathematical equation "[UV^myVar3]=[UV^myVar1]>=[UV^myVar2]*5". In this example, the setting or variable "myVar3" is calculated based on the comparison of setting or variable "myVar1" and setting or variable "myVar2". In particular, myVar1 is compared with myVar2. If the value of myVar1 is greater than or equal to the value of myVar2, then the comparison equation component (i.e., [UV^myVar1]>=[UV^myVar2]) is evaluated to one and multiplied by five to set the calculated value of myVar3 to be equal to five. If, on the other hand, the value of myVar1 is less than the value of myVar2, then the comparison equation component (i.e., [UV^myVar1]>=[UV^myVar2]) is evaluated to zero and multiplied by five to set the calculated value of myVar3 to be equal to zero. As demonstrated by this example, comparisons can be utilized in the calculation of IED settings or variables.

EXAMPLE 10

In appropriate circumstances, it is assumed that the engineer wants to be able to disable or, alternatively, hide an IED setting from the technician. The present invention advantageously provides this capability.

Referring back to FIG. 5B, assuming the engineer wants to disable the IED setting, the appropriate commands are entered. In this instance, the engineer selects the "Disable Panel in Setting Form" command by moving the mouse pointer over its associated checkbox and clicking the left mouse button. After applying this command, by for instance clicking on the "OK" button, the application design file will include appropriate commands to permit the IED setting to be displayed to the technician, but to prevent the technician from modifying it in any respect. As a result, the engineer is able to lock the IED setting and make it read only to the technician.

Still referring to FIG. 5B, assuming the engineer wants to hide the IED setting from the view of the technician, the appropriate commands are entered. In this instance, the engineer selects the "Hide Panel in Setting Form" command by moving the mouse pointer over its associated checkbox and clicking the left mouse button. After applying this command, by for instance clicking on the "OK" button, the application design file will include appropriate commands to hide the IED setting from the view of the technician, but will still allow the IED setting to be used in any applicable equations.

It will also be understood that this description shall not be construed in a limiting sense. Rather, various changes and modifications can be made to the illustrative aspects of the present invention without departing from the true spirit and scope thereof, as defined by the following claims. Furthermore, it will be appreciated that any such changes and modifications will be recognized by those skilled in the art as an equivalent to one or more elements of the following claims, and shall be covered by such claims to the fullest extent permitted by law.

What is claimed is:

1. A computer system, comprising:
    a first computer executing graphical user interface software including editor software adapted to modify a settings management user interface enabling substantially full functionality of settings configuration for an intelligent electronics device, said editor software adapted to create and save an application design file pertaining to properties of a customized settings management user interface upon command, said properties of said customized settings management user interface being based on modifications made to said settings management user interface, said first computer having a storage unit, said storage unit being in communication with said graphical user interface software of said first computer and being able to store said application design file upon command; and
    a second computer executing graphical user interface software including display software and being in communication with said first computer and adapted to receive said application design file from said first computer, said second computer display software being adapted to execute said application design file to cause said customized settings management user interface to be displayed by said second computer, said customized settings management user interface including display of a configurable setting for said intelligent electronics device, said second computer being adapted to receive a command related to configuration of said configurable setting, said second computer being in communication with said intelligent electronics device and being able to deliver data related to said configurable setting to said intelligent electronics device.

2. The computer system of claim 1, wherein access to the editor software to modify the settings management user interface is restricted to persons having a first level of access, and wherein access to the display software to execute said application design file is restricted the persons having the first level of access and persons having a second level of access, the second level of access more restricted than the first level of access and controllable by the persons having the first level of access to minimize configuration errors.

3. A method for customizing a settings management user interface (SMUI) system to minimize configuration errors when configuring a plurality of configurable IED settings for an intelligent electronic device (IED) via the SMUI system, the SMUI system operatively coupled to the IED, the method comprising:
    enabling accessibility to a first plurality of graphical user interfaces of the SMUI system by persons having a first level of access;
    enabling accessibility to a second plurality of graphical user interfaces of the SMUI system by persons having a second level of access, the second level of access more restricted than the first level of access and controllable by the persons having the first level of access;
    in response to detecting a valid request to access the first plurality of graphical user interfaces, causing a first graphical user interface of the first plurality of graphical user interfaces to be displayed, the first graphical user interface of the first plurality of graphical user interfaces including a selectable hierarchical listing of the plurality of configurable IED settings;
    detecting selection of at least one configurable IED setting from the plurality of configurable IED settings by a first person of the persons having the first level of access;
    causing a second graphical user interface of the first plurality of graphical user interfaces to be displayed, the second graphical user interface of the first plurality of graphical user interfaces displaying the at least one configurable IED setting for a first modification by the first person;
    detecting completion of the first modification, the first modification and the remainder of the plurality of configurable IED settings forming an application design file of the SMUI system, the application design file specific to the IED;
    in response to detecting a valid request to access the second plurality of graphical user interfaces, causing a first graphical user interfaces of the second plurality of graphical user interfaces to be displayed, the first settings display of the second plurality graphical user interfaces including the application design file for a second modification by a second person of the persons having the second level of access;

detecting completion of the second modification to the application design file by the second person, completion of the second modification of the application design file enabling a final plurality of tailored IED settings to be formed from the modified application design file; and causing the final plurality of tailored IED settings to be provided to the IED in response to a command by the second person.

4. The method of claim 3, further including causing the application design file to be displayed to the second person via the first graphical user interface of the second plurality of graphical user interfaces.

5. The method of claim 3, wherein the SMUI system further comprises:

a microcontroller including a microprocessor and a memory operatively coupled to the microprocessor;

a display configured to display the first and second plurality of graphical user interfaces;

a first peripheral device coupled to the microcontroller and configured to enable local and remote access to the first and second plurality of graphical user interfaces by persons having the first and second level of access, respectively; and a second peripheral device coupled to the microcontroller and configured to enable communication between the IED and the settings management interface system.

6. The method of claim 3, wherein the SMUI system further comprises:

a first computer including:
a first microcontroller including a microprocessor and a memory operatively coupled to the microprocessor,
a first display configured to display the first plurality of graphical user interfaces to the persons having the first level of access, and
a first peripheral device coupled to the first microcontroller and configured to enable local and remote access to the first plurality of graphical user interfaces by the persons having the first level of access; and a second computer operatively coupled to the first computer and the IED, the second computer including:
a second microcontroller including a microprocessor and a memory operatively coupled to the microprocessor,
a second display configured to display the second plurality of graphical user interfaces to the persons having the second level of access, and
a second peripheral device coupled to the second microcontroller and configured to enable local and remote access to the second plurality of graphical user interfaces by the persons having the second level of access.

7. The method of claim 3, wherein the first modification comprises limiting the plurality of configurable IED settings available for settings value changes by the second person to only the at least one configurable IED setting.

8. The method of claim 3, wherein the first modification comprises limiting the plurality of configurable IED settings visible to the second person to the at least one configurable IED setting.

9. The method of claim 3, wherein the first modification comprises changing an IED setting name associated with the at least one configurable IED setting.

10. The method of claim 3, wherein the first modification comprises changing an IED setting value unit associated with the at least one configurable IED setting.

11. The method of claim 3, wherein the first modification comprises changing an IED value range associated with the at least one configurable IED setting.

12. The method of claim 3, further comprising setting an indication to alert the second person when the second modification causes one of the plurality of configurable IED settings to have a value outside of a predetermined IED value range.

13. The method of claim 3, further comprising preventing the final plurality of tailored IED settings to be delivered to the IED if one of the plurality of configurable IED settings has been assigned a value outside of a predetermined IED value range.

14. The method of claim 3, wherein the first modification comprises changing a text comment associated with the at least one configurable IED setting.

15. The method of claim 3, wherein the first modification comprises changing a language associated with the at least one configurable IED setting.

16. The method of claim 3, wherein the first modification comprises regrouping the at least one configurable IED setting.

17. The method of claim 16, wherein the first modification further comprises re-naming the at least one regrouped configurable IED setting for ease of locating by the second person.

18. The method of claim 3, wherein the first modification comprises causing the at least one configurable IED setting to be available for setting value changes by the second person.

19. The method of claim 3, wherein the first modification comprises configuring at least two of the plurality of configurable IED settings to ensure that they have identical setting values when the second person assigns a setting value to one of the at least two of the plurality of configurable IED settings.

20. The method of claim 3, wherein the first modification further comprises editing, via a third graphical user interface of the first plurality of graphical user interfaces, a mathematical equation associated with the at least one of the plurality of configurable IED settings.

21. The method of claim 20, wherein the third graphical user interface of the first plurality of graphical user interfaces comprises an Equation Builder graphical user interface.

22. The method of claim 20, wherein the at least one configurable IED setting is a customized IED setting of the plurality of configurable IED settings, and wherein the first modification comprises constructing a Boolean logic equation associated with the customized IED setting via the third graphical user interface of the first plurality of graphical user interfaces.

23. The method of claim 22, wherein the customized IED setting is configured to control an aspect of IED operation during testing of the IED using the final plurality of tailored IED settings.

24. The method of claim 22, further comprising:
uploading a plurality of actual IED settings from the IED to the SMUI system for comparison with the application design file; and
providing an error indication to the second person if differences are detected between plurality of actual IED settings and the application design file.

25. The method of claim 3, wherein the second modification comprises entering a first setting value for the at least one configurable IED setting, and wherein the first modification comprises causing a second setting value to be calculated for the at least one configurable IED setting based on the first setting value when the first setting value is entered.

26. The method of claim 3, wherein the second modification comprises changing at least one setting value of the plurality of configurable IED settings.

27. The method of claim 3, wherein the persons having the first level of access include application interface designers, and wherein the persons having the second level of access include IED field end-users.

28. The method of claim 3, wherein the first graphical user interface of the first plurality of graphical user interfaces further comprises:
   a selectable plurality of dialog boxes configured to receive IED settings values and text;
   a selectable plurality of configurable control equations and associated logic simulators;
   a selectable plurality of virtual buttons associated with IED configuration activities; and
   a tool bar having a number of selectable pull-down menus associated with the plurality of IED settings.

29. The method of claim 3, wherein the first graphical user interface of the first plurality of graphical user interfaces comprises an editor mode graphical user interface.

30. The method of claim 3, wherein the second graphical user interface of the first plurality of graphical user interfaces comprises an setting form graphical user interface.

31. The method of claim 3, wherein the first graphical user interface of the second plurality of graphical user interface comprises an editor mode graphical user interface.

32. A method for customizing a settings management user interface (SMUI) system to minimize configuration errors when configuring a plurality of settings for an intelligent electronic device (IED) via the SMUI system, the SMUI system operatively coupled to the IED, the method comprising:
   enabling accessibility to a first plurality of graphical user interfaces of the SMUI system by persons having a first level of access;
   enabling accessibility to a second plurality of graphical user interfaces of the SMUJ system by persons having a second level of access, the second level of access more restricted than the first level of access and controllable by the persons having the first level of access;
   in response detecting a valid request to access the first plurality of graphical user interfaces, displaying a first graphical user interface of the first plurality of graphical user interfaces, the first graphical user interface of the first plurality of graphical user interfaces including a selectable hierarchical listing of a plurality of configurable IED settings associated with the IED;
   detecting selection of at least one configurable IED setting from the plurality of configurable IED settings by a first person of the persons having the first level of access;
   causing a second graphical user interface of the first plurality of graphical user interfaces to be displayed, the second graphical user interface of the first plurality of graphical user interfaces displaying the at least one configurable IED setting;
   detecting a request to prevent persons having the second level of access from providing the at least one configurable IED setting to the IED, the plurality of configurable IED settings excluding the at least one configurable IED setting forming an application design file of the SMUI system, the application design file specific to the IED;
   in response to a valid request to access the second plurality of graphical user interfaces, causing a first graphical user interface of the second plurality of graphical user interfaces-to be displayed, the first graphical user interface of the second plurality of graphical user interfaces displaying the application design file for a modification by a second person of the persons having the second level of access;
   detecting completion of the modification to the application design file by the second person, completion of the modification enabling a final plurality of tailored IED settings to be formed from the modified application design file, the final plurality of tailored IED settings excluding the at least one configurable IED setting; and
   causing the final plurality of tailored IED settings to be provided to the IED in response to a command by the second person.

33. The method of claim 32, further including causing the application design file to be displayed to the second person via the first graphical user interface of the second plurality of graphical user interfaces.

34. The method of claim 32, wherein the SMUI system further comprises:
   a microcontroller including a microprocessor and a memory operatively coupled to the microprocessor;
   a display configured to display the first and second plurality of graphical user interfaces;
   a first peripheral device coupled to the microcontroller and configured to enable local and remote access to the first and second plurality of graphical user interfaces by the persons having the first and second level of access, respectively; and
   a second peripheral device coupled to the microcontroller and configured to enable communication between the IED and the settings management interface system.

35. The method of claim 32, wherein the SMUJ system further comprises:
   a first computer including:
      a first microcontroller including a microprocessor and a memory operatively coupled to the microprocessor,
      a first display configured to display the first plurality of graphical user interfaces, and
      a first peripheral device coupled to the first microcontroller and configured to enable local and remote access to the first plurality of graphical user interfaces by the persons having the first level of access; and a second computer operatively coupled to the first computer and the IED, the second computer including:
      a second microcontroller including a microprocessor and a memory operatively coupled to the microprocessor,
      a second display configured to display the second plurality of graphical user interfaces, and
      a second peripheral device coupled to the second microcontroller and configured to enable local and remote access to the second plurality of graphical user interfaces by persons having the second level of access.

36. The method of claim 32, wherein the persons having the first level of access include application interface designers, and wherein the persons having the second level of access include IED field end-users.

37. The method of claim 32, wherein the first graphical user interface of the first plurality of graphical user interfaces further comprises:
   a selectable plurality of dialog boxes configured to receive IED settings values and text;
   a selectable plurality of configurable control equations and associated logic simulators;

a selectable plurality of virtual buttons associated with IED configuration activities; and a tool bar having a number of selectable pull-down menus associated with the plurality of IED settings.

38. The method of claim 32, wherein the first graphical user interface of the first plurality of graphical user interfaces comprises an editor mode graphical user interface.

39. The method of claim 32, wherein the second graphical user interface of the first plurality of graphical user interfaces comprises an setting form graphical user interface.

40. The method of claim 32, wherein the first graphical user interface of the second plurality of graphical user interfaces comprises an editor mode graphical user interface.

* * * * *